(12) United States Patent
Jo et al.

(10) Patent No.: US 12,069,210 B2
(45) Date of Patent: Aug. 20, 2024

(54) IMAGE FORMING APPARATUS

(71) Applicant: BROTHER KOGYO KABUSHIKI KAISHA, Nagoya (JP)

(72) Inventors: Hidenori Jo, Nagoya (JP); Mariko Mogi, Nagoya (JP); Yuki Nagashima, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/540,869

(22) Filed: Dec. 2, 2021

(65) Prior Publication Data

US 2022/0182501 A1 Jun. 9, 2022

(30) Foreign Application Priority Data

Dec. 3, 2020 (JP) ................................. 2020-201304
Mar. 3, 2021 (JP) ................................. 2021-033211
Sep. 24, 2021 (JP) ................................. 2021-154991

(51) Int. Cl.
*H04N 1/00* (2006.01)

(52) U.S. Cl.
CPC ..... *H04N 1/00315* (2013.01); *H04N 1/00206* (2013.01); *H04N 1/00241* (2013.01); *H04N 1/00307* (2013.01)

(58) Field of Classification Search
None
See application file for complete search history.

(56) References Cited

U.S. PATENT DOCUMENTS

| 2004/0247337 | A1* | 12/2004 | Ohama | G03G 21/1619 399/107 |
| 2006/0246866 | A1* | 11/2006 | Nakagawa | H04N 1/00281 455/575.1 |
| 2012/0048934 | A1* | 3/2012 | Iwayama | G06K 7/0008 235/440 |
| 2014/0132652 | A1* | 5/2014 | Nakamura | H01Q 7/00 347/1 |
| 2014/0293369 | A1* | 10/2014 | Hori | H01Q 1/22 358/474 |

(Continued)

FOREIGN PATENT DOCUMENTS

| JP | 2008009739 | * | 1/2008 | ............... H04N 1/00 |
| JP | 2014195186 | * | 10/2014 | ............... H04N 1/00 |

(Continued)

*Primary Examiner* — Beniyam Menberu
(74) *Attorney, Agent, or Firm* — Merchant & Gould P.C.

(57) ABSTRACT

An image forming apparatus includes an image forming unit, a first housing, an image reading unit including a reading sensor, a communication circuit board including a communication antenna capable of short-distance wireless communication, a second housing located above the first housing and accommodating the image reading unit and the communication circuit board, and an operation panel located in front of the second housing. The second housing includes a first side wall located at a rear of the operation panel, and a second side wall located at the rear of the operation panel. An inner surface of the first side wall is opposed to the communication circuit board. An outer surface of the first side-wall has a mark indicating a position to which a communication object is brought close.

17 Claims, 24 Drawing Sheets

(56) References Cited

U.S. PATENT DOCUMENTS

| | | | |
|---|---|---|---|
| 2015/0277823 A1* | 10/2015 | Nakayama | G06F 21/608 |
| | | | 358/1.14 |
| 2016/0065761 A1* | 3/2016 | Honda | H04N 1/00342 |
| | | | 358/1.15 |
| 2016/0330337 A1* | 11/2016 | Hori | H01Q 1/22 |
| 2018/0103173 A1* | 4/2018 | Ogasawara | H04N 1/121 |
| 2018/0234563 A1 | 8/2018 | Ido et al. | |
| 2020/0012775 A1* | 1/2020 | Yoshino | G03G 21/1882 |
| 2020/0068078 A1* | 2/2020 | Lee | G06F 3/0414 |
| 2020/0112644 A1 | 4/2020 | Shingai et al. | |

FOREIGN PATENT DOCUMENTS

| | | | | |
|---|---|---|---|---|
| JP | 2018045682 | * | 3/2018 | G06T 7/00 |
| JP | 2018-129754 A | | 8/2018 | |
| JP | 2018157404 | * | 10/2018 | H04N 1/00 |
| JP | 2018165204 | * | 10/2018 | H04N 1/00 |
| JP | 2018169562 | * | 11/2018 | H04N 1/00 |
| JP | 2019135562 | * | 8/2019 | H04N 1/00 |
| JP | 2020-057972 A | | 4/2020 | |

* cited by examiner

FIG.17
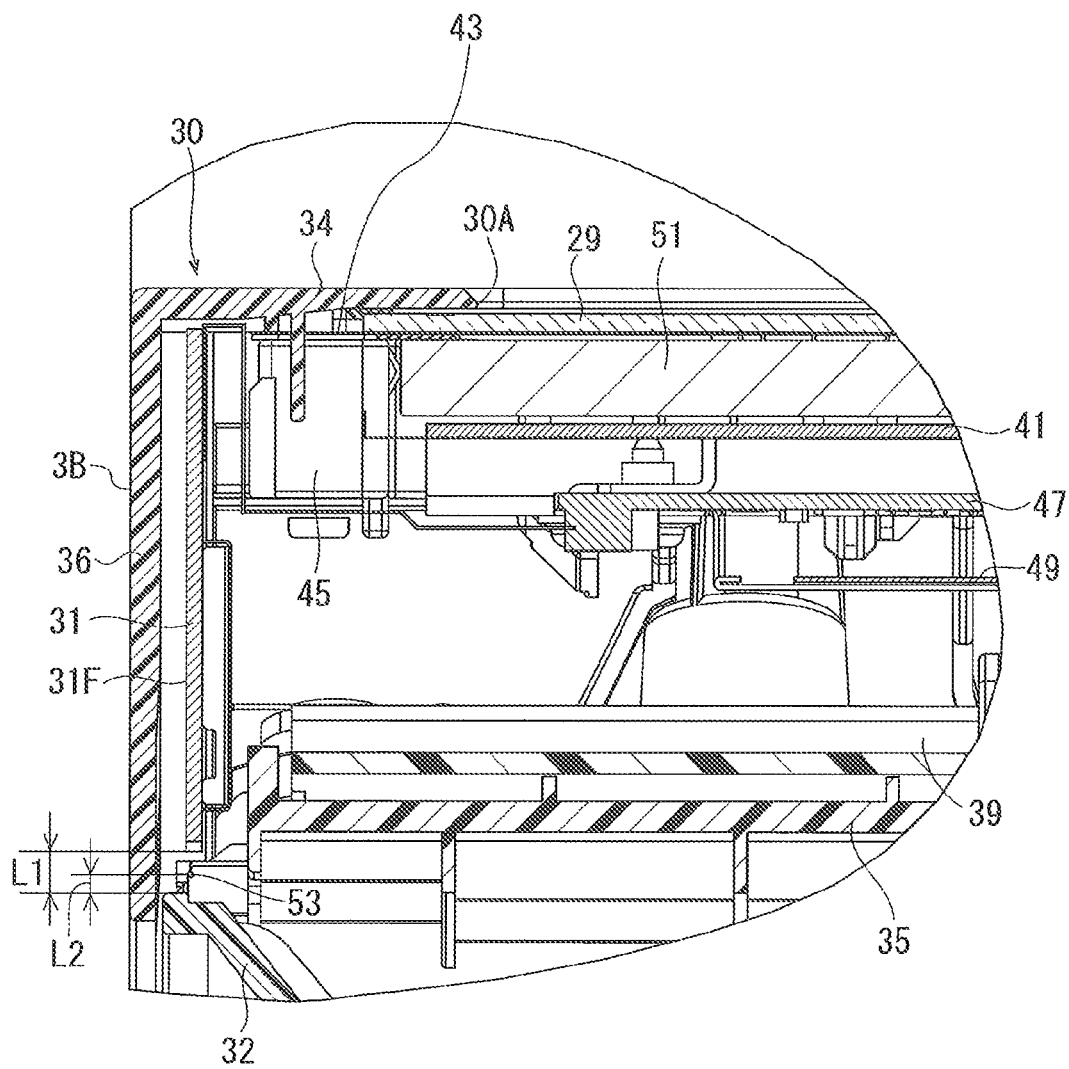
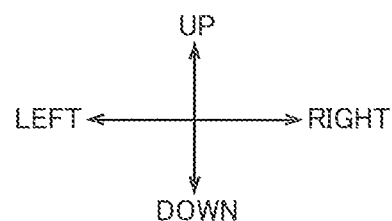

FIG.18
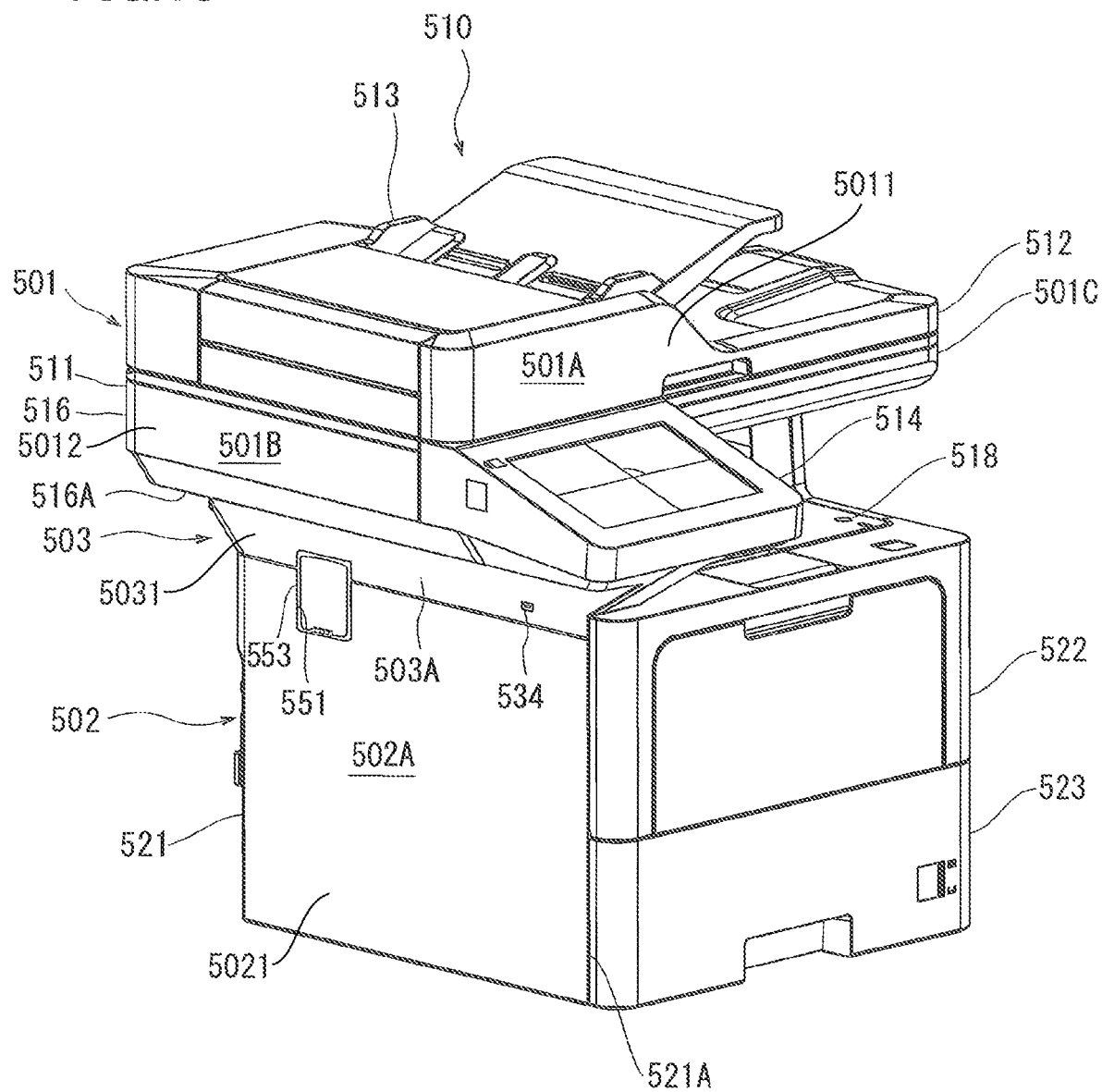
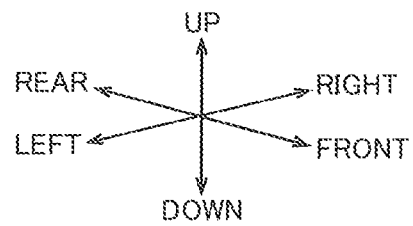

FIG.19
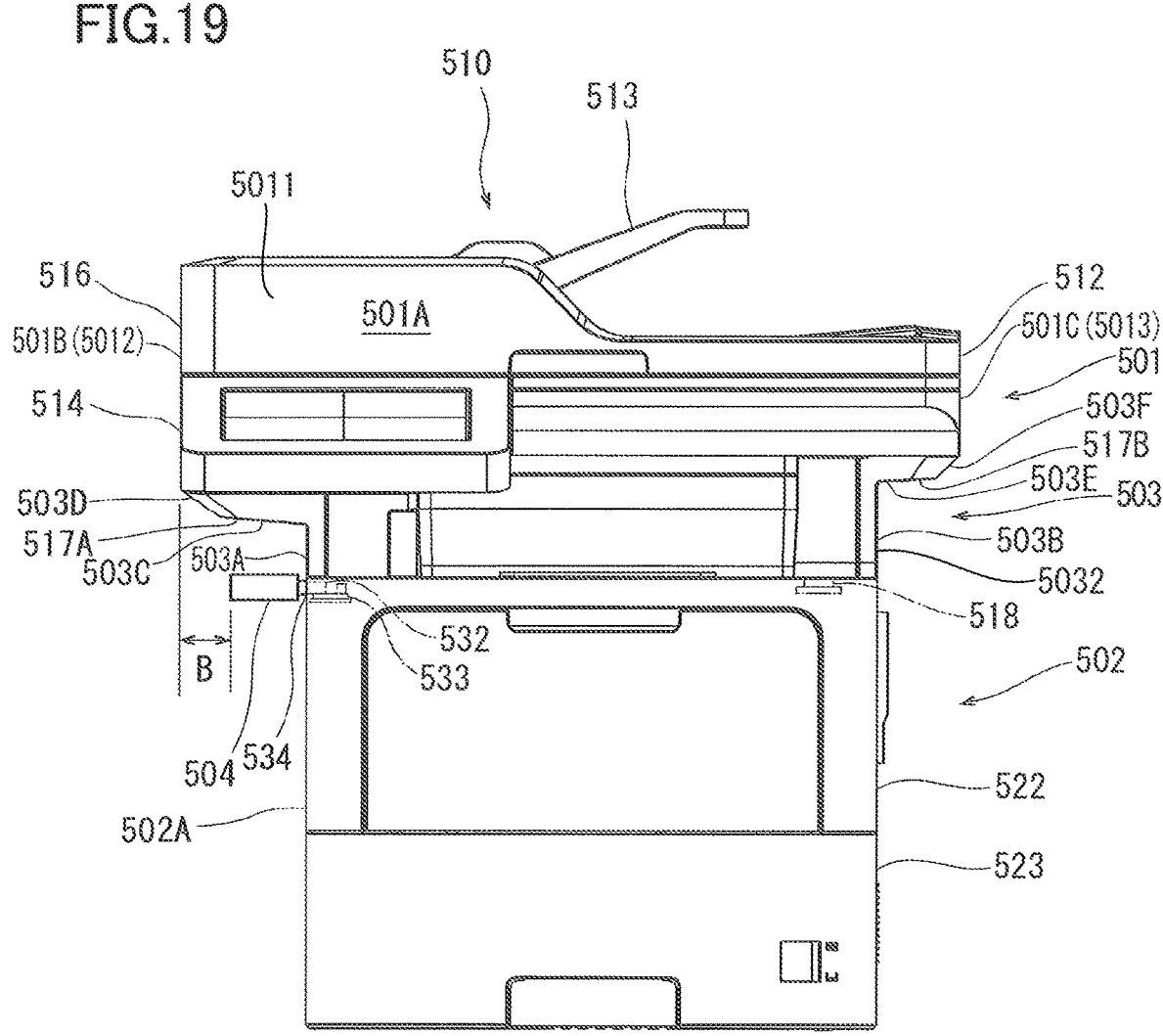
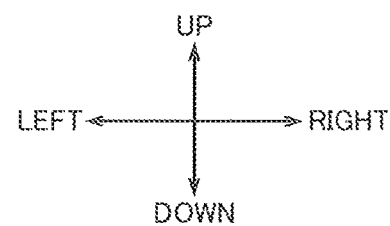

FIG.24
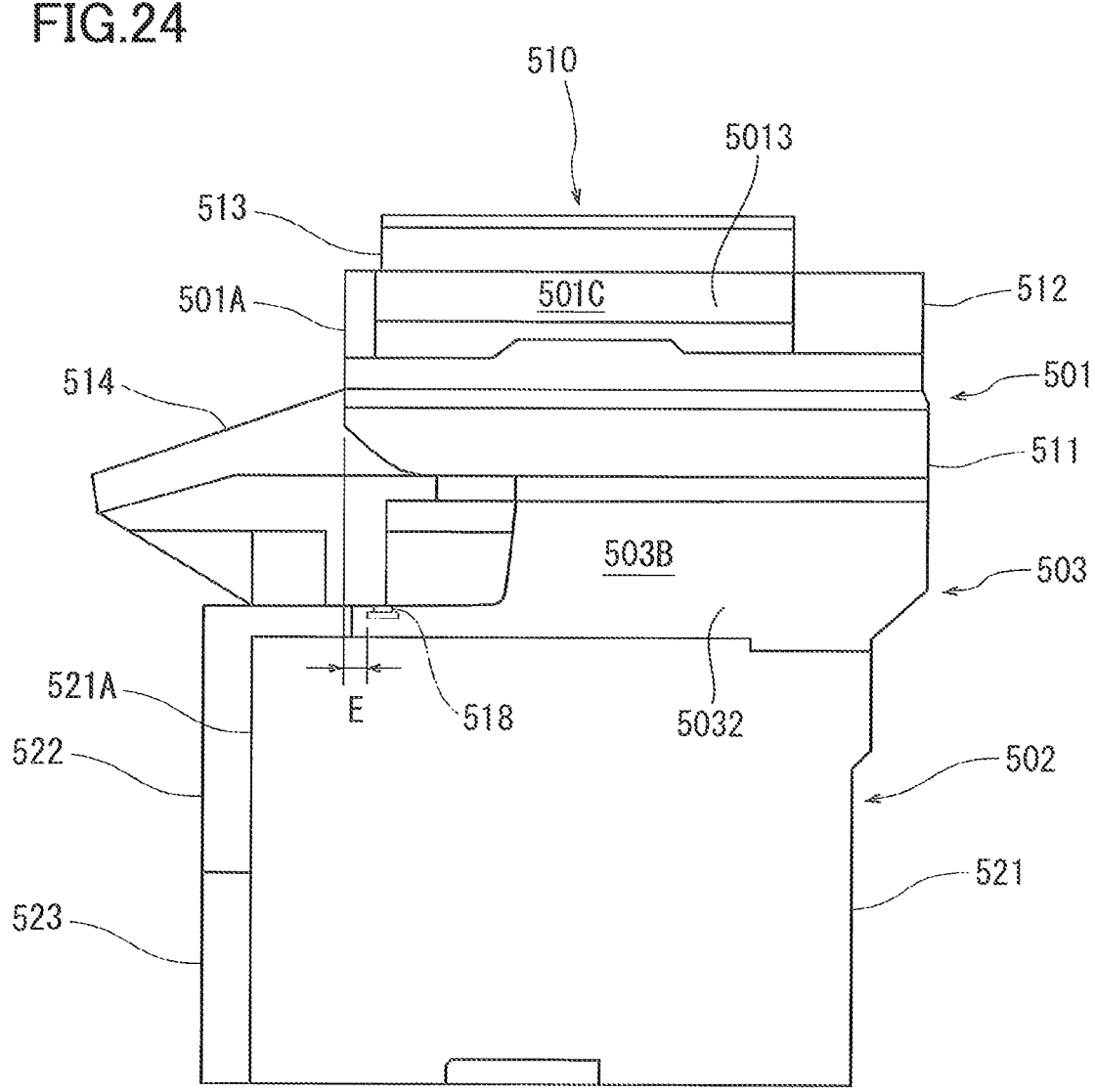
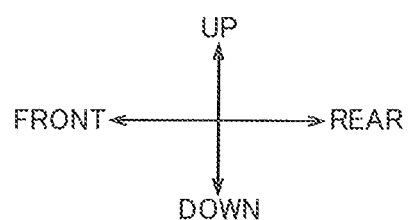

FIG.25
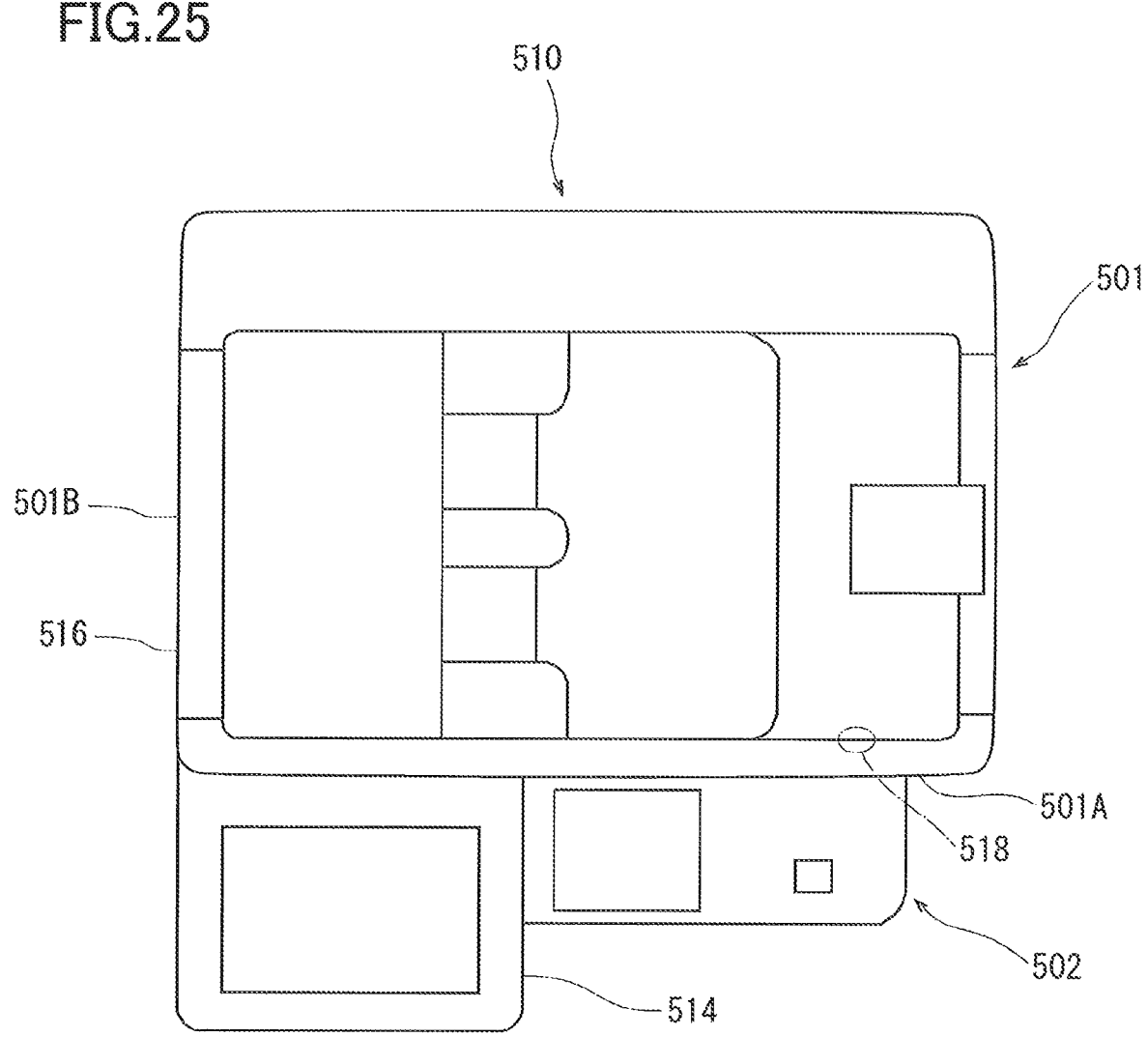
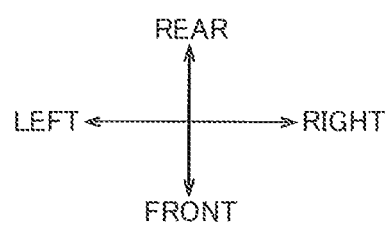

IMAGE FORMING APPARATUS

CROSS REFERENCE TO RELATED APPLICATION

The present application claims priority from Japanese Patent Application Nos. 2021-154991, 2020-201304, and 2021-033211, which were respectively filed on Sep. 24, 2021, Dec. 3, 2020, and Mar. 3, 2021, the disclosures of which are herein incorporated by reference in their entirety.

BACKGROUND

The following disclosure relates to an image forming apparatus.

There has been known a conventional image forming apparatus as an example of a MFP (MultiFunction Peripheral). The MFP includes a printing unit, a scanner unit, and an operation panel. The scanner unit is located above the printing unit. The operation panel is located in front of the scanner unit.

The operation panel accommodates a communication circuit board in a narrow area adjacent to a front end corner of a touch panel and a display. The communication circuit board includes a communication antenna capable of short-distance wireless communication such as NFC (Near Field Communication) with a communication object such as a smart phone and an IC card of a user.

Moreover, the operation panel includes a mark provided at a position on the operation panel corresponding to a position of the communication circuit board. The position of the mark indicates a position to which the communication object is brought close so as to communicate the communication circuit board.

When the user brings the communication object close to the mark, the circuit board transmits/receives various information such as image information, setting information, and certification information to/from the communication object by the short-distance wireless communication.

SUMMARY

However, in the conventional MFP, there is a possibility that a dimension of the touch panel in an up and down direction becomes small in accordance with shapes of the touch panel and the display, and there is a possibility that the area adjacent to the touch panel and the display becomes narrow. As a result, there is a need for excessively downsizing the communication circuit board to dispose in the narrow area adjacent to the touch panel and the display in the operation panel of the MFP. Accordingly, there is a problem in which it is difficult to increase the design flexibility of the communication circuit board.

An aspect of the disclosure relates to an image forming apparatus capable of increasing the design flexibility of a communication circuit board without the need of excessively downsizing the communication circuit board.

In one aspect of the disclosure, an image forming apparatus includes an image forming unit configured to form an image on a sheet, a first housing accommodating the image forming unit, an image reading unit including a reading sensor configured to read an image, a communication circuit board including a communication antenna capable of short-distance wireless communication, a second housing located above the first housing and accommodating the image reading unit and the communication circuit board, and an operation panel located in front of the second housing. The second housing includes a first side wall located at a rear of the operation panel and extending in a front and rear direction, the first side wall being located on a first side with respect to the reading sensor in a width direction orthogonal to the front and rear direction, and a second side wall located at the rear of the operation panel and extending in the front and rear direction, the second side wall being located on a second side with respect to the reading sensor in the width direction, the second side being located on a side opposite to the first side with respect to the reading sensor in the width direction. An inner surface of the first side wall is opposed to the communication circuit board. A mark indicating a position to which a communication object is brought close is formed on an outer surface of the first side-wall, the communication object being an object for communicating with the communication circuit board.

In another aspect of the disclosure, an image forming apparatus includes an image forming unit configured to form an image on a sheet, a first housing accommodating the image forming unit, an image reading unit including a reading sensor configured to read an image, a communication circuit board including a communication antenna capable of short-distance wireless communication, a second housing located above the first housing and accommodating the image reading unit and the communication circuit board, and an operation panel located in front of the second housing. The operation panel is connected to the second housing and protruding from the second housing. The operation panel includes an operation unit configured to receive operations and the communication circuit board. The operation panel includes a first face facing a first direction and on which the operation unit is placed, and a second face facing a second direction orthogonal to the first direction. A width in the first direction of the second face of the operation panel increases toward a base end at which the operation panel is connected to the second housing from a protruding end, and a mark indicating a position to which a communication object for communicating with the communication circuit board is brought close is positioned at an area, on the second face, nearer to the base end than to the protruding end of the second face.

In another aspect of the disclosure, an image forming apparatus includes a print engine including a photosensitive drum, a first housing accommodating the print engine, a scanner including a reading sensor for reading an image, a communication circuit board including a communication antenna capable of short-distance wireless communication, a second housing located above the first housing and accommodating the scanner and the communication circuit board. The second housing includes a first side wall extending in a front and rear direction, the first side wall being located on a first side with respect to the reading sensor in a width direction orthogonal to the front and rear direction, the first side wall having an inner surface which is opposed to the communication circuit board and an outer surface which has a mark indicating a position to which a communication object for communicating with the communication circuit board is brought close, and a second side wall extending in the front and rear direction, the second side wall being located on a second side with respect to the reading sensor in the width direction, the second side being located on a side opposite to the first side with respect to the reading sensor in the width direction, and an operation panel provided to the second housing and located at a front of the second housing. In another aspect of the disclosure, an image forming apparatus includes a print engine including a photosensitive drum, a first housing accommodating the print engine, a scanner including a reading sensor for reading an image, a communication circuit board including a communication antenna capable of short-distance wireless communication, and a second housing located above the first housing and accommodating the scanner and the communication circuit board. The operation panel is connected to the second housing and protruding from the second housing. The operation panel includes an operation unit configured to receive operations and the communication circuit board, the operation panel including a first face facing a first direction and on which the operation unit is placed, and a second face facing a second direction orthogonal to the first direction. A width in the first direction of the second face of the operation panel increases toward a base end at which the operation panel is connected to the second housing from a protruding end, and a mark indicating a position to which a communication object for communicating with the communication circuit board is brought close is positioned at an area, on the second face, nearer to the base end than to the protruding end of the second face.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 17 is a cross-sectional view illustrating an operation panel of the embodiment of the MFP;

FIG. 18 is a perspective view of an embodiment of an image forming apparatus when viewed from a front left thereof;

FIG. 19 is a front elevational view of the embodiment of the image forming apparatus;

FIG. 24 is a right side elevational view of the embodiment of the image forming apparatus schematically illustrating a positional relationship between the upper housing and the power switch;

FIG. 25 is a plan view of the embodiment of the image forming apparatus schematically illustrating a positional relationship between the upper housing and the power switch;

EMBODIMENTS

First Embodiment

Figure 1:
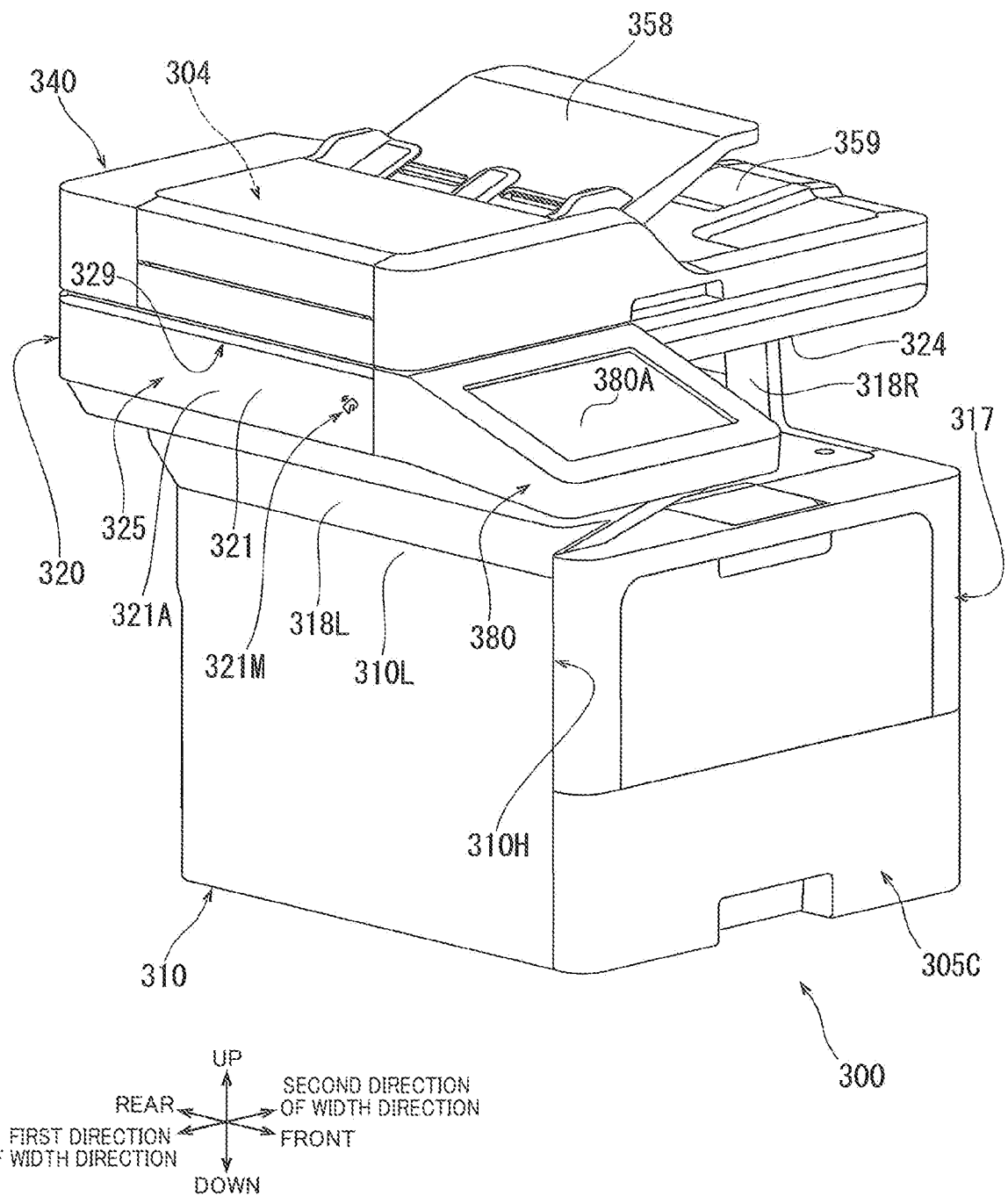
FIG. 1 is a perspective view illustrating an embodiment of a MFP (Multifunction Peripheral)

There will be described a first embodiment of this disclosure in detail. As illustrated in FIG. 1, an embodiment of a MFP 300 is an example of an image forming apparatus of the present disclosure. In FIG. 1, a side of the MFP 300 at which an operation panel 380 is located is a front side of the MFP 300. A width direction of the MFP 300 is a direction orthogonal to a front and rear direction, and extends in a horizontal direction. When facing the operation panel 380, a left side of the operation panel 380 is a first side in the width direction and a right dire of the operation panel 380 is a second side in the width direction. Moreover, a direction in which from the second side toward the first side is a first direction of the width direction, and a direction from the first side toward the second side is a second direction of the width direction. That is, the first direction of the width direction is opposite to the second direction of the width direction. Each of directions in FIG. 2 to FIG. 11 is displayed so as to correspond to each of directions in FIG. 1.

As illustrated in FIG. 1 to FIG. 4, the MFP 300 includes a first housing 310, an image forming unit 305, a second housing 320, an image reading unit 302, the operation panel 380, and an automatic document feeder 340.

First Housing and Image Forming Apparatus

Figure 2:
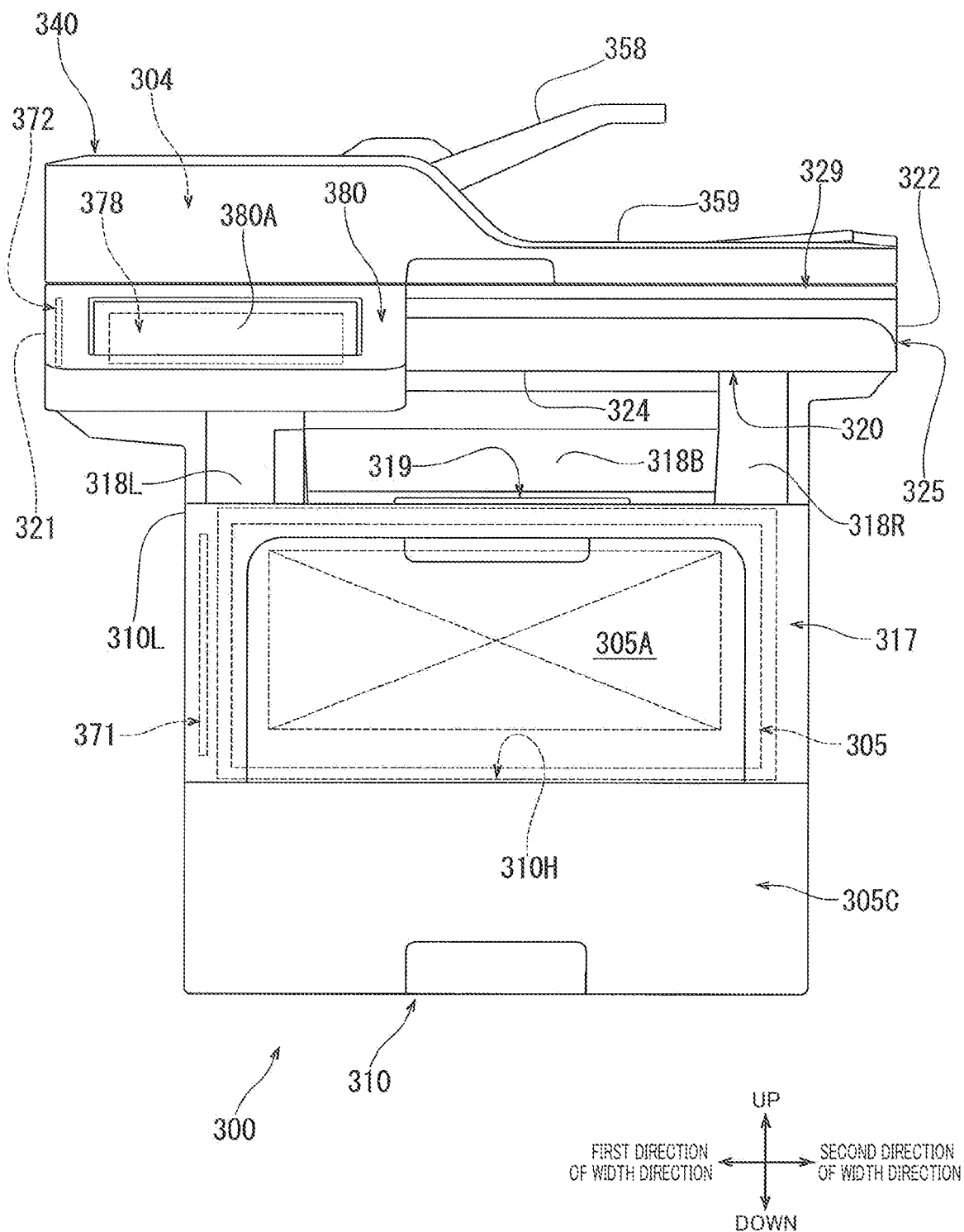
FIG. 2 is a front elevational view of the embodiment of the MFP.
Figure 3:
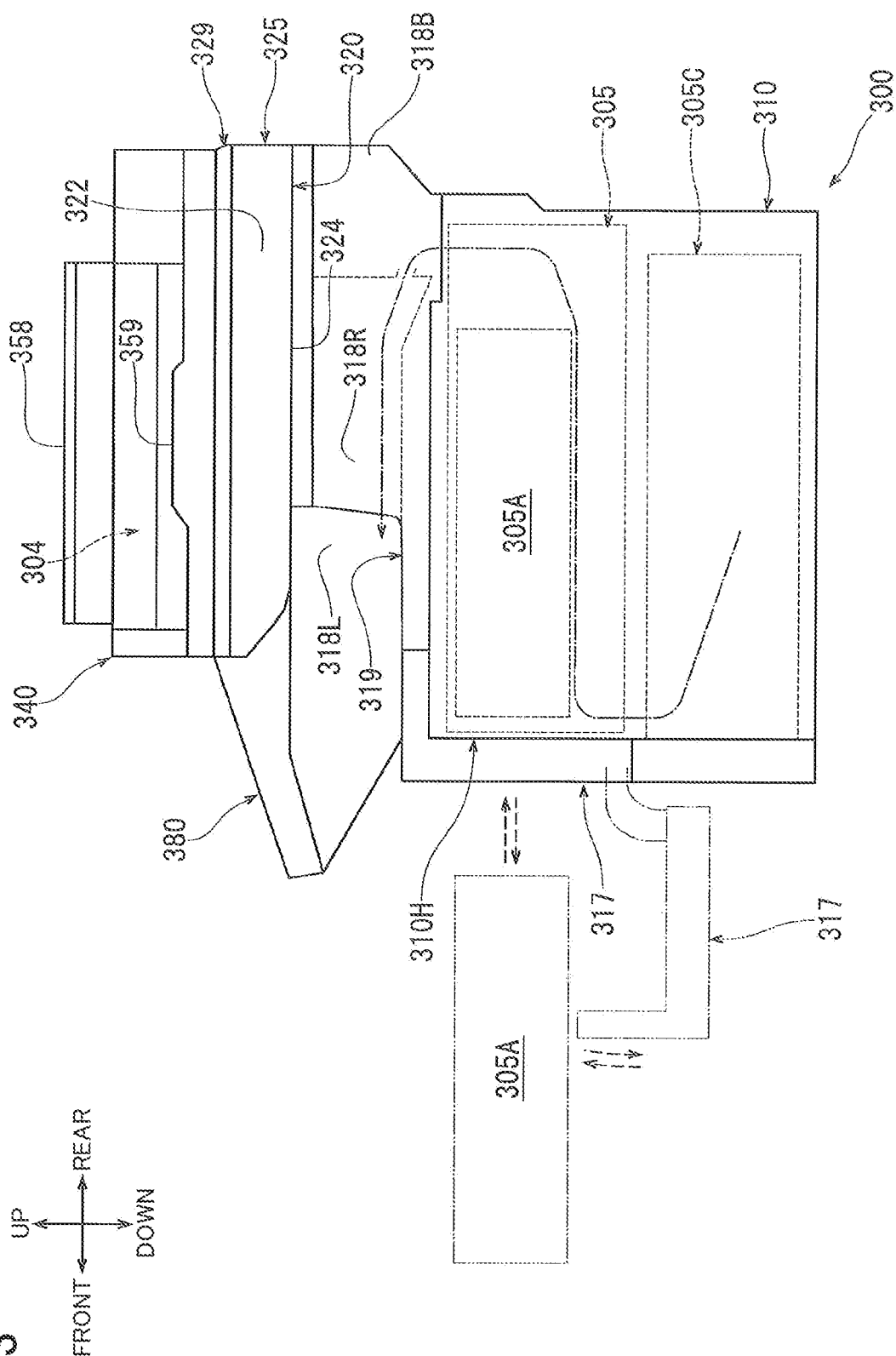
FIG. 3 is a side elevational view of the embodiment of the MFP illustrating overall configurations of an image forming unit, a front opening, a front cover, and an after-image-forming discharge tray.

The first housing 310 is shaped approximately like a box. As illustrated in FIG. 2 and FIG. 3, the first housing 310 accommodates a sheet cassette 305C at a lower part of the first housing 310. The sheet cassette 305C supports sheets, on which images are to be formed, stacked on one another.

Moreover, the first housing 310 accommodates the image forming unit 305 at an upper part located above the sheet cassette 305C in the first housing 310. The image forming unit 305 is configured to form an image on the sheet conveyed from the sheet cassette 305C by an electrophotographic method.

The image forming unit 305 includes a drawer unit 305A. The drawer unit 305A includes photoconductive drums, developing rollers, toner containers, which are not illustrated, and the like, and constitutes a part of the image forming unit 305.

Moreover, the first housing 310 includes a front opening 310H and a front cover 317. The front opening 310H is an example of a front opening. The front cover 317 is an example of a front cover.

The front opening 310H opens at a position above the sheet cassette 305C in a front face of the first housing 310. The front opening 310H allows access to the drawer unit 305A, and the like of the image forming unit 305.

The front cover 317 is an exterior cover constituting a part of the front face of the first housing 310 located above the sheet cassette 305C, and closes the front opening 310H.

As illustrated in FIG. 3, when the user pivots the front cover 317 frontward, an upper end of the front cover 317 moves forwardly and downwardly, like the front cover 317 illustrated by the two-dot chain lines. As a result, the front cover 317 opens the front opening 310H.

As a result of this, like the drawer unit 305A illustrated by the two-dot chain lines in FIG. 3, the user forwardly pulls out the drawer unit 305A from an inner side of the first housing through the front opening 310H, and the user can conduct maintenance operations such as an exchange of consumables.

As illustrated in FIG. 2 and FIG. 3, the first housing 310 includes an after-image-forming-discharge tray 319, and support portions 318L, 318R, 318B at an upper face side of the first housing 310. It is noted that the after-image-forming-discharge tray 319 is an example of a second discharge tray.

The after-image-forming-discharge tray 319 is located at a center, in the width direction, in the upper face side of the first housing 310. The support portions 318L, 318R, 318B protrude upward than the after-image-forming-discharge tray 319, and the after-image-forming-discharge tray 319 is surrounded by the support portions 318L and 318R in the width direction and surrounded by the support portion 318B in a rear direction.

As illustrated in FIG. 3, the image forming unit 305 is configured to forwardly discharge the sheet on which the image is formed from a rear side of the first housing 310. The after-image-forming-discharge tray 319 supports the discharged sheet.

Second Housing and Image Reading Unit

As illustrated in FIG. 1 to FIG. 4, the second housing 320 is located above the first housing. The first housing 310 supports the second housing 320 by the support portions 318L, 318R, 318B.

As illustrated in FIG. 1 to FIG. 8, the second housing 320 includes a scanner base 325 and a frame body 329. The scanner base 325 and the frame body 329 are respectively resin moldings manufactured by injection molding of thermoplastic resin, and the like.

Figure 7:
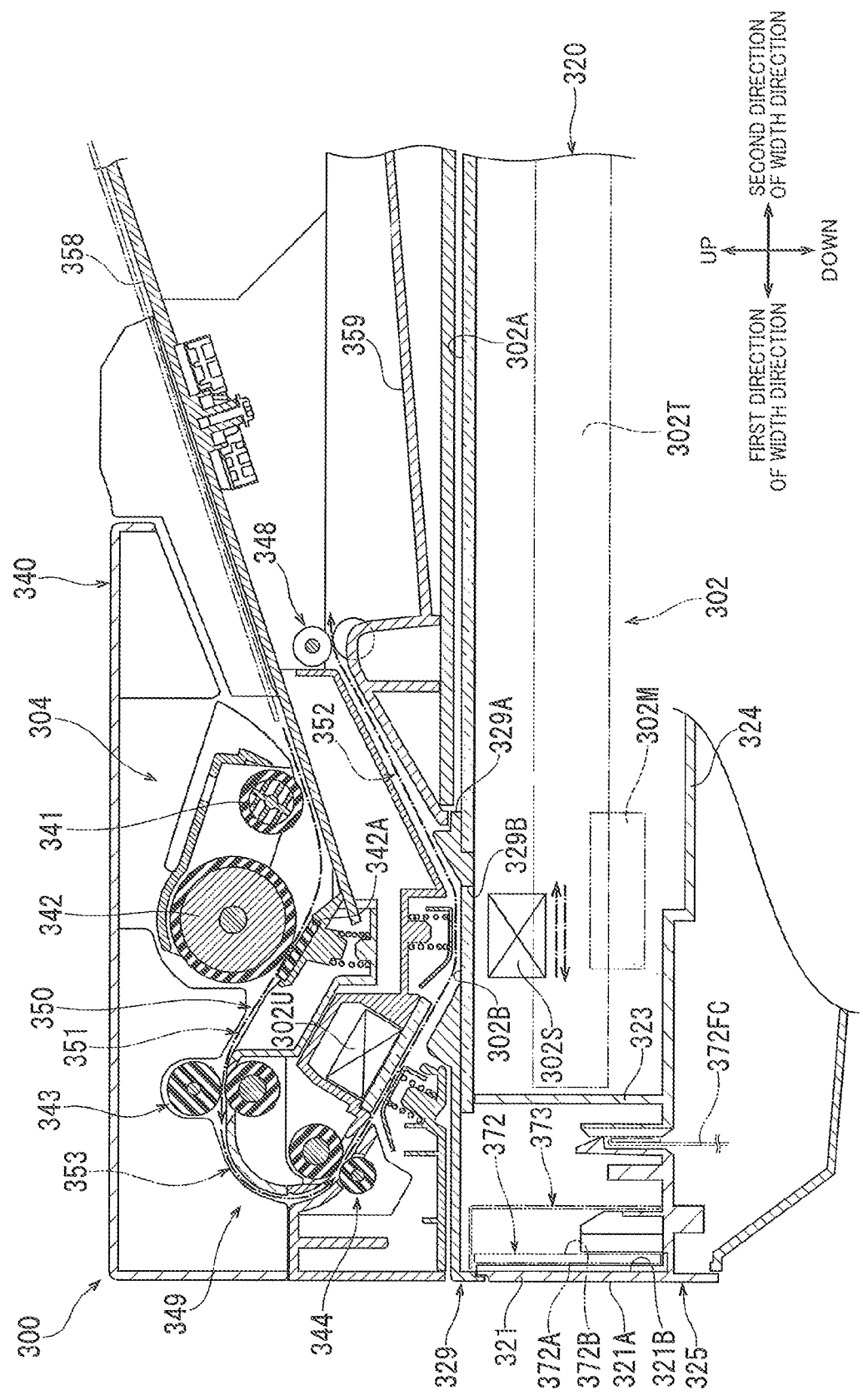
FIG. 7 is a partial cross-sectional view of the embodiment of the MFP explaining inner configurations of the second housing and the automatic document feeder.

The scanner base 325 is shaped approximately like a flatness box in which a length of the box in the up and down direction is largely less than a length of the first housing 310 in the up and down direction. As illustrated in FIG. 7, the scanner base 325 includes a bottom wall 324 extending in the front and rear direction and the width direction, and opens upward from the bottom wall 324.

Figure 4:
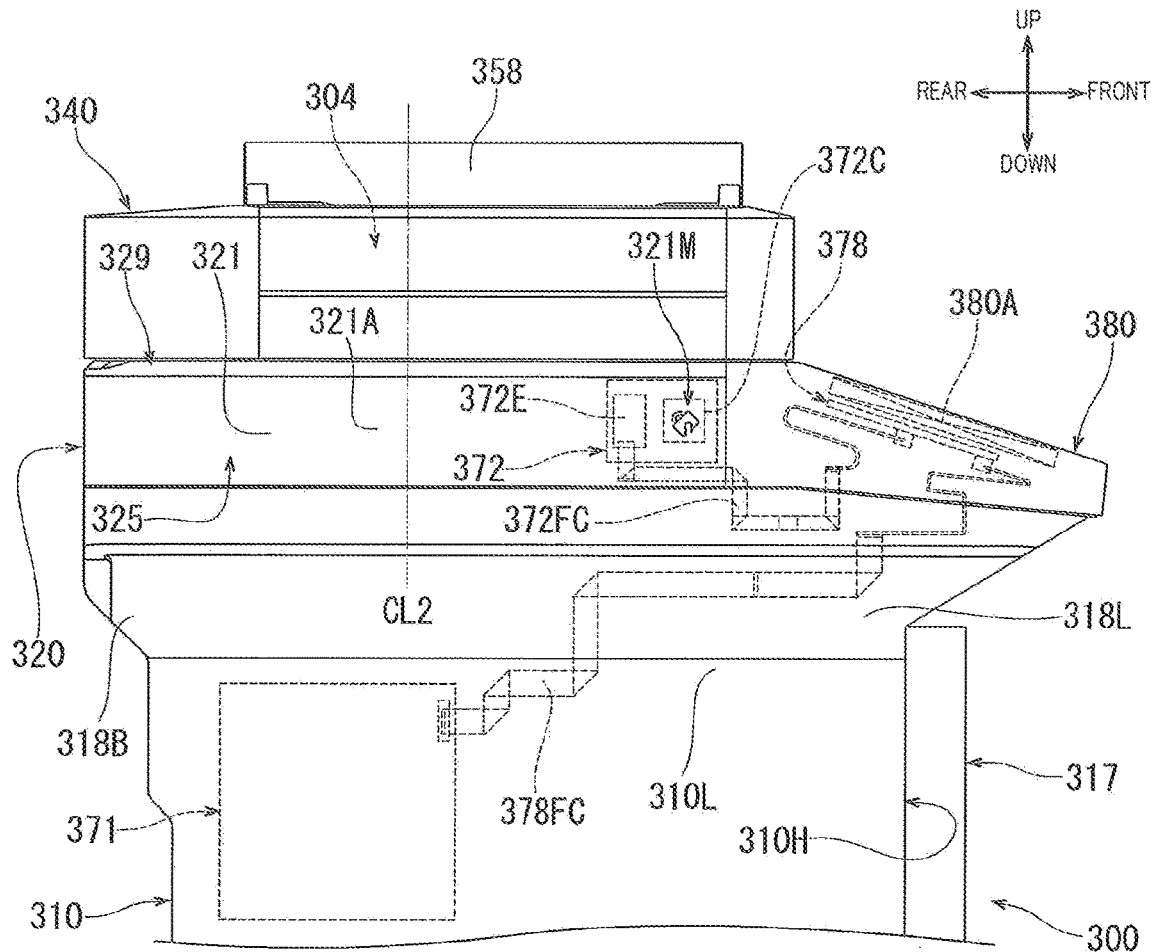
FIG. 4 is a partial side elevational view of the embodiment of the MFP illustrating a relative relationship among a communication circuit board, a panel circuit board, a main circuit board, a first cable and a second cable.
Figure 5:
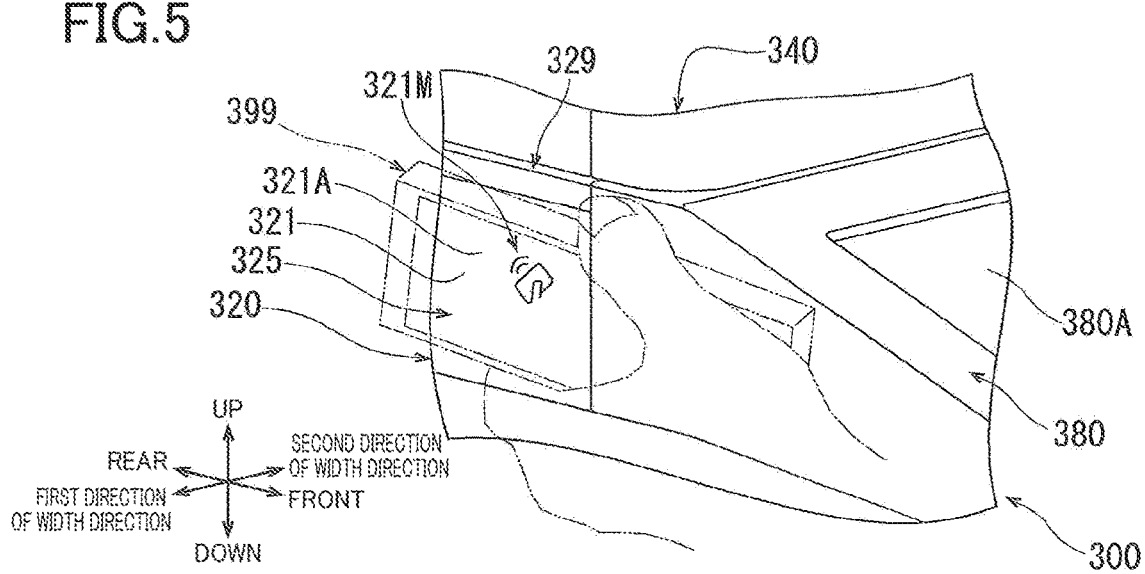
FIG. 5 is a partial perspective view of the embodiment of the MFP explaining operations of bringing a communication object close to a mark by a user.
Figure 6:
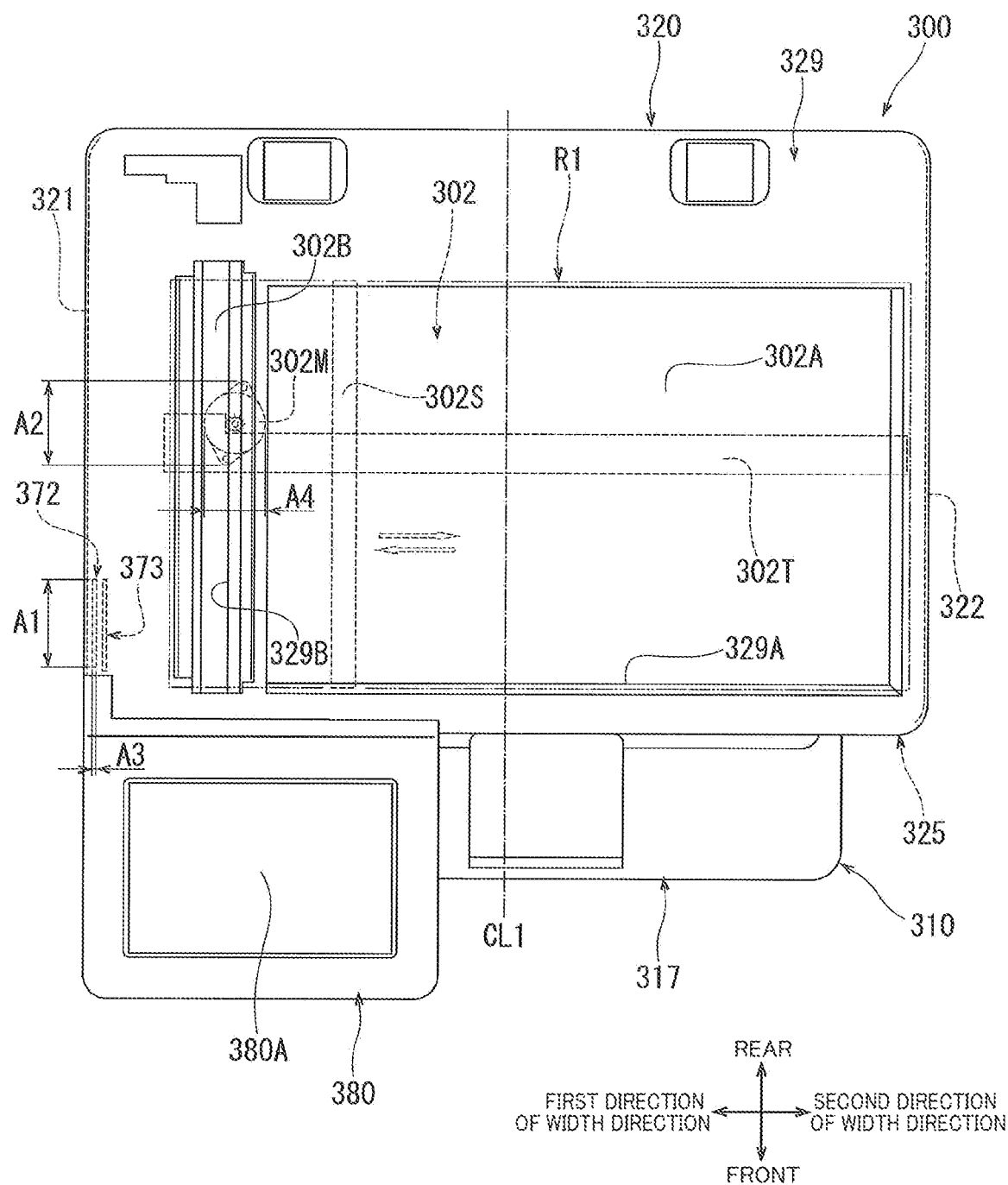
FIG. 6 is a top view of the embodiment of the MFP mainly illustrating a second housing in a state in which an automatic document feeder is removed.

The scanner base 325 includes a first side-wall 321 illustrated in FIG. 1, FIG. 4 to FIG. 8, and a second side-wall 322 illustrated in FIG. 2, FIG. 3, FIG. 6.

Figure 8:
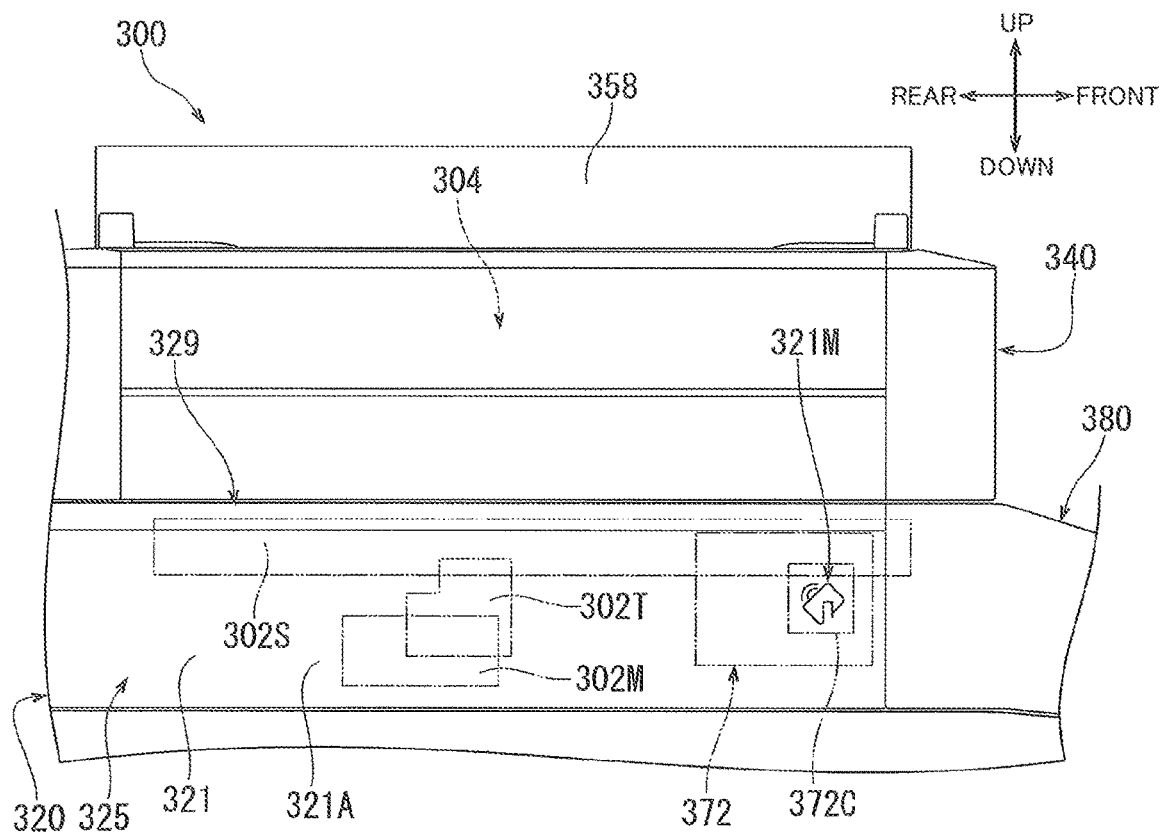
FIG. 8 is a partial side elevational view of the embodiment of the MFP illustrating a relative relationship between the communication circuit board and a reading sensor.

As illustrated in FIG. 8, the first side-wall 321 extends in the up and down direction so as to connect a side edge of the bottom wall 324 located at a first end of the bottom wall 324 in the first direction of the width direction, and, as illustrated in FIG. 1, the first side-wall 321 extends from a front end to a rear end of the second housing 320 in the front and rear direction. An outer face 321A in the first side-wall 321 that faces the first direction of the width direction constitutes a part of an exterior face of the second housing 320.

As illustrated in FIG. 2, the first side-wall 321 is located at a first side, in the width direction, of an end portion 310L of the first housing 310 located at a first end of the first housing 310 in the first direction of the width direction. That is, the first-side-wall 321 is located at an outer position than the end portion 310L in the width direction. In other words, the first-side-wall 321 is located farther from a center of the first housing 310 in the width direction than the end portion 310L of the first housing 310.

Though not illustrated in detail, the second side-wall 322 is connected to a side edge of the bottom wall 324 located at a second end of the bottom wall 324 in the second direction of the width direction. As illustrated in FIG. 3, the second side-wall 322 extends in the up and down direction, and extends from the front end to the rear end of the second housing 320 in the front and rear direction. An outer face in the second side-wall 322 that faces the second direction of the width direction constitutes a part of the exterior face of the second housing 320, as similar to the outer face 321A of the first side-wall 321. It is noted that the first direction of the width direction is opposite to the second direction of the width direction.

As illustrated in FIG. 6, the scanner base 325 supports the frame body 329 by the first side-wall 321, the second side-wall 322, a front wall connecting a front end of the first side-wall 321 and a front end of the second side-wall 322, and a rear wall connecting a rear end of the first side-wall 321 and a rear end of the second side-wall 322.

The frame body 329 includes a first opening 329A and a second opening 329B. The first opening 329A is a rectangular shaped opening widely extending from a position located between a center CL1 of the second housing 320 in the width direction and the first side-wall 321 to a position near the second side-wall 322. The second opening 329B is a rectangular shaped opening elongated in the front and rear direction and positioned between the first opening 329A and the first side-wall 321.

As illustrated in FIG. 6 and FIG. 7, the second housing 320 accommodates the image reading unit 302 in a space defined by the scanner base 325 and the frame body 329. The image reading unit 302 includes a document-supporting surface 302A, a reading surface 302B, a reading sensor 302S, a moving mechanism 302T, and a motor 302M.

The document-supporting surface 302A is an upper face of a platen glass which is configured to cover the first opening 329A of the frame body 329 from a lower side and exposed from the first opening 329A. The reading surface 302B is an upper surface of another platen glass which is configured to cover the second opening 329B of the frame body 329 from a lower side and exposed from the second opening 329B.

As illustrated in FIG. 7, the scanner base 325 includes a supporting wall 323. The supporting wall 323 protrudes upward from the bottom wall 324 at a position spaced apart from the first side-wall 321 in the second direction of the width direction, and extends in the front and rear direction.

An upper end of the supporting wall 323 and a lower face of the frame body 329 interpose an edge of the platen glass having the reading surface 302B located at an end of the platen glass in the first direction of the width direction, and hold the platen glass.

The document-supporting surface 302A supports the document to be read by image reading. The documents to be read by image reading are sheets such as recording sheets and OHP (Overhead Projector) sheets, books and the like. The reading surface 302B is used when a conveyance mechanism 304 of the automatic document feeder 340, which will be described below, operates.

As illustrated in FIG. 6 and FIG. 7, the reading sensor 302S is a conventional image reading sensor such as a CIS (Contact Image Sensor) and a CCD (Charge Coupled Device), and elongatedly extends in the front and rear direction.

Though not illustrated in detail, the moving mechanism 302T includes conventional configurations including a guide shaft extending in the width direction so as to slidably support the reading sensor 302S below the document-supporting surface 302A and the reading surface 302B, a drive pulley located at an end of the guide shaft in the first direction of the width direction, a driven pulley located at an end of the guide shaft in the second direction of the width direction, a timing belt wound around the drive pulley and the driven pulley and coupled to the reading sensor 302S, and the like.

The motor 302M transmits driving force to the moving mechanism 302T, and rotates the drive pulley of the moving mechanism 302T in a clockwise direction and a counter-clockwise direction. As a result of this, the moving mechanism 302T moves the reading sensor 302S in the first direction of the width direction, and moves the reading sensor 302S in the second direction of the width direction. A movement area R1 of the reading sensor 302S is illustrated in FIG. 6.

A end of the movement area R1 in the first direction of the width direction is a position at which the reading sensor 302S waits and located between the reading surface 302B and the supporting wall 323 illustrated in FIG. 7 in the width direction.

In a case where the image reading unit 302 reads the image on the document supported by the document-supporting surface 302A, the reading sensor 302S reads the image on the document along the front and rear direction, that is, a line-shaped area extending in a sub-scanning direction, while the reading sensor 302S moves, by operations of the motor 302M and the moving mechanism 302T, in the second direction of the width direction, that is, in a main scanning direction, below the document-supporting surface 302A. The reading sensor 302S ends reading of the image when the reading sensor 302S reaches an end of the movement area R1 in the second direction of the width direction, and returns to a waiting position by operations of the motor 302M and the moving mechanism 302T.

It is noted that in a case where the conveyance mechanism 304, which will be described below, operates, the reading sensor 302S moves to a standstill reading position by operations of the motor 302M and the moving mechanism 302T, and stops at the standstill reading position.

As illustrated in FIG. 6 and FIG. 7, the first side-wall 321 is located at a first side than the reading sensor 302S in the first direction of the width direction. That is, the side-wall 321 is located at a position farther from a center of the first housing 310 in the width direction than the reading sensor 302S in the width direction. As illustrated in FIG. 6, the second side-wall 322 is located at a second side than the reading sensor 302S in the second direction of the width direction. That is, the second side-wall 322 is located at a position farther from the center of the first housing 310 than the reading sensor 302S in the width wise direction.

Operation Panel

As illustrated in FIG. 6, the operation panel 380 is located in front of the scanner base 325 and the frame body 329 of the second housing 320. The operation panel 380 is located at a position nearer to the first side-wall 321 than the center CL1 in the second housing 320 in the width direction. A first side-face of the operation panel 380 that is located at an end of the operation panel 380 in the first direction of the width direction and the outer face 321A of the first side-wall 321 are aligned with each other.

As illustrated in FIG. 4, the first side-wall 321 is located at a rear of the operation panel 380. A front end of the first side-wall 321 is opposed to a rear end of a first side face of the operation panel 380 in the first direction of the width direction. As illustrated in FIG. 3, the second side-wall 322 is located at a rear of the operation panel 380.

As illustrated in FIG. 1, an upper face of the operation panel 380 inclines slowly downward in a direction toward the front end such that the front end is located below the rear end. According to this, a length, in the up and down direction, of a first side face located at a first end of the operation panel 380 in the first direction of the width direction gradually decreases toward the front end of the first side face of the operation panel 380 from the rear end of the first side face of the operation panel 380. It is noted that the length of the front end of the operation panel 380 in the up and down direction is less than a length of a communication circuit board 372, which will be described below, in the up and down direction.

The operation panel 380 includes an input/output portion 380A on an upper surface of the operation panel 380. The input/output portion 380A includes a touch panel having a transparency and a LCD panel located below the touch panel.

The input/output portion 380A is configured to receive, by the touch panel, inputs of operating instruction inputted to the image forming unit 305, the image reading unit 302, and the conveyance mechanism 304, which will be described below, by the user. Moreover, the input/output portion 380A is configured to display, on the LCD panel, images indicating operating statuses and settings of the image forming unit 305, the image reading unit 302, the conveyance mechanism 304, which will be described below, and the like.

Automatic Document Feeder

As illustrated in FIG. 1, the automatic document feeder 340 is located above the second housing 320. A rear end of the automatic document feeder 340 is pivotably coupled to a rear end of the second housing 320 via a hinge, which is not illustrated.

A bottom face of the automatic document feeder 340 is a flat face capable of covering an entire of the frame body 329 of the second housing 320. That is, the automatic document feeder 340 also serves as a document cover configured to cover a document placed on the document-supporting surface 302A of the second housing 320.

Though not illustrated in detail, when the user pivots the automatic document feeder 340 upward, a front end of the automatic document feeder 340 is moved upward and rearward. As a result, the automatic document feeder 340 opens the document-supporting surface 302A. In this situation, the user can place/pull out a document to/from the document-supporting surface 302A.

As illustrated in FIG. 1 and FIG. 7, the automatic document feeder 340 includes a supply tray 358 and a discharge tray 359. Each of the supply tray 358 and the discharge tray 359 is located on a second side in the automatic document feeder 340 in the second direction of the width direction. It is noted that the discharge tray 359 is an example of a first discharge tray.

The supply tray 358 is located above the discharge tray 359. The supply tray 358 supports sheet-like documents, which are subject to be read, stacked on one another.

As illustrated in FIG. 7, the automatic document feeder 340 includes the conveyance mechanism 304, a conveyance guide 350, and a rear-side reading sensor 302U. Each of the conveyance mechanism 304, the conveyance guide 350, and the rear-side reading sensor 302U is located on a first side in the automatic document feeder 340 in the first direction of the width direction.

The conveyance mechanism 304 includes a supplying roller 341, a separating roller 342, a separating pad 342A, a pair of first conveying rollers 343, a pair of second conveying rollers 344, and a pair of discharging rollers 348, which are conventional configurations.

The supplying roller 341 is opposed to, from an upper side, a first end portion of the supply tray 358 located at an end of the supply tray 358 in the first direction of the width direction. Each of the separating roller 342 and the separating pad 342A is located on a first side than the supplying roller 341 in the first direction of the width direction.

Each of the pair of first conveying rollers 343 and the pair of second conveying rollers 344 is located at a conveyance end portion 349 of the automatic document feeder 340 that is located at a first end portion of the automatic document feeder 340 in the first direction of the width direction. The pair of first conveying rollers 343 is located above the pair of second conveying rollers 344.

The pair of discharging rollers 348 is located above a first end portion of the discharge tray 359 that is located at an end of the discharge tray 359 in the first direction of the width direction.

The conveyance guide 350 includes a first part 351, a second part 352, and a third part 353. The first part 351, the second part 352, and the third part 353 are constituted by portions of a plurality of chute members and a plurality of ribs protruding downward from a lower face of an upper cover of the automatic document feeder located inside the automatic document feeder 340.

The first part 351 is a guide configured to guide a document from a first end of the supply tray 358 located at an end of the supply tray 358 in the first direction of the width direction to the pair of first conveying rollers 343 located at the conveyance end portion 349.

The second part 352 is a guide configured to guide the document from the pair of second conveying rollers 344 located at the conveyance end portion 349 toward the discharge tray 359, that is, to the pair of discharging rollers 348.

More specifically, the second part 352 guides a document obliquely downward from the pair of second conveying rollers 344 to the reading surface 302B, and then guides the document on the reading surface 302B, that is, causes the document to pass over the reading sensor 302S which is in the standstill reading position. After that, the second part 352 guides the document obliquely upward to the pair of discharging rollers 348.

The third part 353 is connected to each of the first part 351 and the second part 352 at the conveyance end portion 349. The third part 353 is a guide configured to guide the document from the pair of first conveying rollers 343 to the pair of second conveying rollers 344 so as to make a U-turn.

The rear-side reading sensor 302U faces, from an upper side, an intermediate portion of an downwardly inclined portion between the pair of second conveying rollers 344 and the reading surface 302B in the second part 352. The rear-side reading sensor 302U is an image reading sensor, that is the same in kind to the reading sensor 302S.

When the conveyance mechanism 304 conveys the documents supported by the supply tray 358 one by one, and the conveyance guide 350 guides the document conveyed by the conveyance mechanism 304 so as to pass over the reading sensor 302S, the reading sensor 302S reads images formed on a surface of the document. In a case where reading images respectively formed on both sides of the document, the rear-side reading sensor 302U reads the image on the back side of the document before the reading sensor 302S. Then, the pair of discharging rollers 348 discharges the document having been read toward the discharge tray 359, and the discharge tray 359 supports the document.

Main Circuit Board, Panel Circuit Board, and Second Cable

As illustrated in FIG. 2 and FIG. 4, the image forming unit 305 includes a main circuit board 371. The main circuit board 371 is located on a first side in the first housing 310 in the first direction of the width direction.

The main circuit board 371 has a circuit configured to transmit/receive various information to/from the image forming unit 305, the image reading unit 302, and the conveyance mechanism 304 to control the image forming unit 305, the image reading unit 302, and the conveyance mechanism 304, and adjust power supply for the image forming unit 305, the image reading unit 302, and the conveyance mechanism 304.

The operation panel 380 includes a panel circuit board 378. The panel circuit board 378 is located below the input/output portion 380A in the operation panel 380.

The panel circuit board 378 has a circuit configured to control the input/output portion 380A to operate the image forming unit 305, the image reading unit 302, and the conveyance mechanism 304.

As illustrated in FIG. 4, the MFP 300 further includes a second cable 378FC. The second cable 378FC is wired from an inside of the first housing 310 to an inside of the operation panel 380 by being bent a plurality of times so as to connect the panel circuit board 378 and the main circuit board 371.

The second cable 378FC is, what is called, a flat cable formed by joining, like a belt-shaped, a plurality of covered wires for signal communication and power supply.

Communication Circuit Board, First Cable, Mark, and Shield Member

Figure 9:
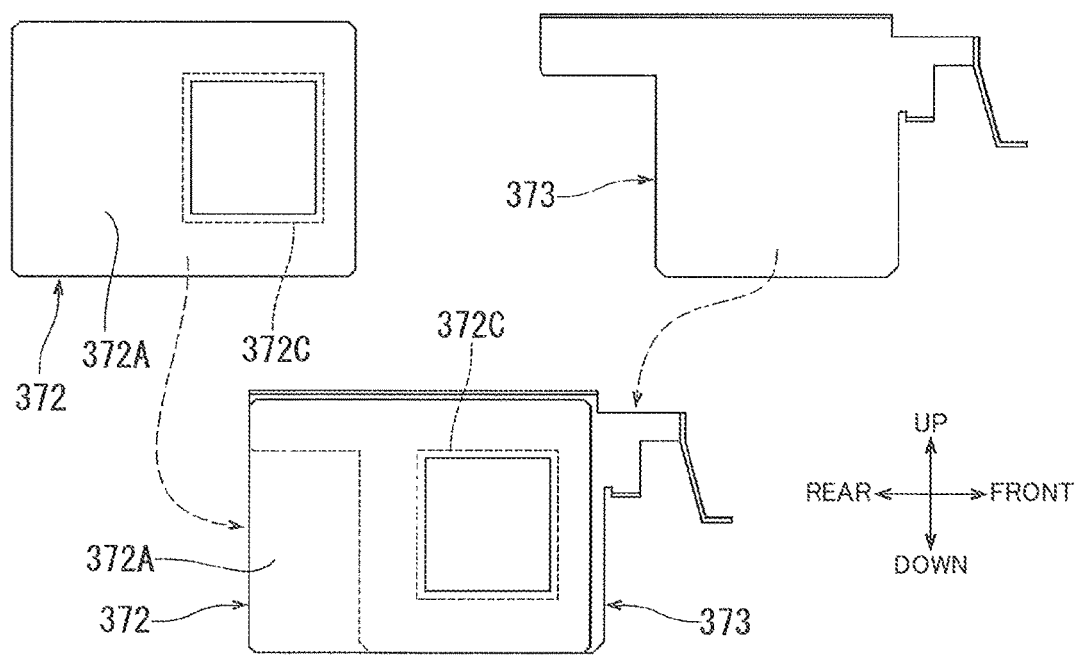
FIG. 9 is a side elevational view of the communication circuit board and a shield member.

As illustrated in FIG. 2, FIG. 4, FIG. 6-FIG. 10, the MFP 300 includes the communication circuit board 372. As illustrated in FIG. 1, FIG. 4, FIG. 5 and FIG. 8, the outer face 321A of the first side-wall 321 of the second housing 320 includes a mark 321M. As illustrated in FIG. 6, FIG. 7 and FIG. 9, the second housing 320 accommodates a shield member 373. As illustrated in FIG. 4, the MFP 300 further comprises a first cable 372FC.

The communication circuit board 372 is approximately a rectangular-plate shape extending in the up and down direction and the front and rear direction. The communication circuit board 372 includes a communication antenna 372C and a communication circuit 372E.

The communication antenna 372C a loop-shaped antenna capable of the short-distance wireless communication. The communication circuit 372E is a circuit configured to control the short-distance wireless communication and transmit/receive signals to/from the main circuit board 371.

The first cable 372FC is wired from an inside of the second housing 320 to the inside of the operation panel 380 by being bent a plurality of times so as to connect the communication circuit board 372 and the panel circuit board 378.

The first cable 372FC is a flat cable the same as the second cable 378FC, however, the first cable 372FC has the less number of the covered wires and core wires of the covered wire are thin in comparison with the second cable 378FC.

The communication circuit board 372 and the main circuit board 371 are connected by the first cable 372FC, the panel circuit board 378, and the second cable 378FC. As a result, the first cable 372FC becomes short, and it is possible to suppress increase of resistance value of the first cable 372FC. Moreover, it is possible to supply power to the first cable 372FC in the panel circuit board 378 again.

Figure 10:
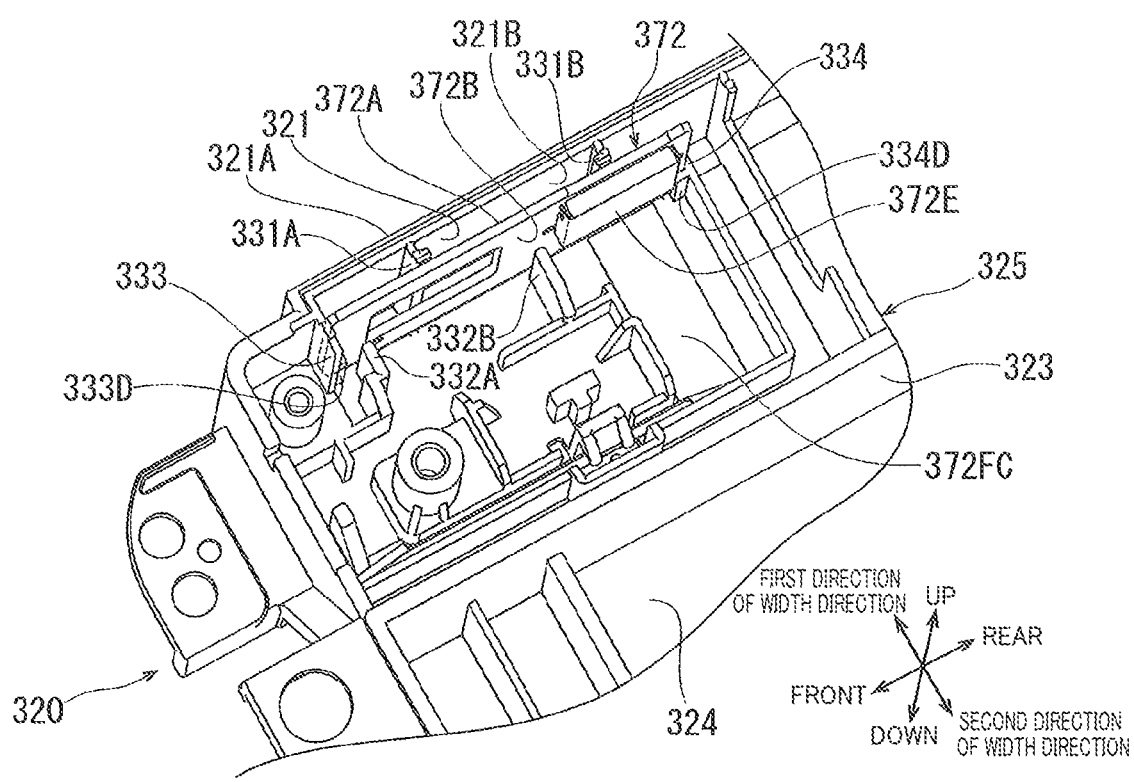
FIG. 10 is a partial perspective view illustrating a situation in which a first to a fourth ribs of the second housing hold the communication circuit board.

As illustrated in FIG. 7 and FIG. 10, the communication circuit board 372 includes a first circuit board surface 372A and a second circuit board surface 372B. The first circuit board surface 372A is approximately a flat face facing in the first direction of the width direction. The communication antenna 372C is formed on the first circuit board surface 372A and faces in the first direction of the width direction. The second circuit board surface 372B is approximately a flat face facing a direction opposite to the first circuit board surface 372A, that is, faces in the second direction of the width direction.

The first circuit board surface 372A of the communication circuit board 372 is opposed to an inner face 321B of the first side-wall 321 facing the second direction of the width direction. Configurations of a first ribs 331A, 331B, a second ribs 332A, 332B, a third rib 333, and a fourth rib 334 each illustrated in FIG. 10 and holding the communication circuit board 372 will be described below.

As illustrated in FIG. 6, the communication circuit board 372 is located between the first side-wall 321 and the movement area R1 of the reading sensor 302S in the width direction. As illustrated in FIG. 8, when viewed in the width direction, an upper part of the communication circuit board 372 overlaps a front part of the reading sensor 302S each other.

As illustrated in FIG. 6, a first range A1 occupied by the communication circuit board 372 in the front and rear direction is spaced forwardly apart from a second range A2 occupied by the motor 302M in the front and rear direction. A third range A3 occupied by the communication circuit board 372 in the width direction is spaced, in the first direction of the width direction, apart from a fourth range A4 occupied by the motor 302M in the width direction.

As illustrated in FIG. 4, the communication circuit board 372 is located in front of a center CL2 which is a center of the first side-wall 321 in the front and rear direction. More specifically, the communication circuit board 372 is located near a front end of the first side-wall 321. Moreover, the communication antenna 372C of the communication circuit board 372 is opposed to the inner face 321B of the first side-wall 321.

As illustrated in FIG. 7, the communication circuit board 372 is located below the third part 353 of the conveyance guide 350.

As illustrated in FIG. 4, the outer face 321A of the first side-wall 321 includes the mark 321M. The mark 321M is located in front of the center CL2 of the first side-wall 321 in the front and rear direction, as similar to the communication circuit board 372. More specifically, the mark 321M is located near a front end of the first side-wall 321. When viewed in the width direction, in other words, when viewed in a direction orthogonal to the first circuit board surface 372A of the communication circuit board 372, the mark 321M is located inside the loop-shaped communication antenna 372C.

As illustrated in FIG. 5, the mark 321M indicates a position to which a communication object 399 is brought close so as to communicate with the communication circuit board 372. A shape of the mark 321M is an example, the shape may be various shapes and designs as long as the user easily understands the meaning.

The communication object 399 is, for example, a portable information terminal such as a smart phone, and an IC card, and the like. In a state in which the user brings the communication object 399 close to the mark 321M, the communication circuit board 372 performs the short-distance wireless communication with the communication object 399 by transmitting/receiving weak radio wave to/from the communication object 399 via the communication antenna 372C.

By the short-distance wireless communication with between the communication object 399 and the communication circuit board 372, the main circuit board 371 receives information for forming images on the sheet, setting information, and the like from the communication object 399, transmits information to the communication object 399, and certifies based on information transmitted from the communication object 399.

As illustrated in FIG. 9, the shield member 373 is a plate-like member formed by electrically-conductive material capable of shielding electromagnetic waves. In the present embodiment, the shield member 373 is a metal plate member manufactured by pressing and bending a steel sheet.

A length of the shield member 373 in the up and down direction is slightly greater than a length of the communication circuit board 372 in the up and down direction. A length of an upper part of the shield member 373 in the front and rear direction is slightly greater than a length of the communication circuit board 372 in the front and rear direction.

As illustrated in FIG. 7, the shield member 373 is located on a second side than the communication circuit board 372 in the second direction of the width direction. An upper end of the shield member 373 covers an upper end of the communication circuit board 372 from an upper side by being bent toward the first direction of the width direction.

As illustrated in FIG. 6 and FIG. 7, the shield member 373 is located between the reading sensor 302S and the communication circuit board 372. The shield member 373 prevents noise from reaching the reading sensor 302S by shielding the noise generated by the communication circuit board 372.

Figure 11:
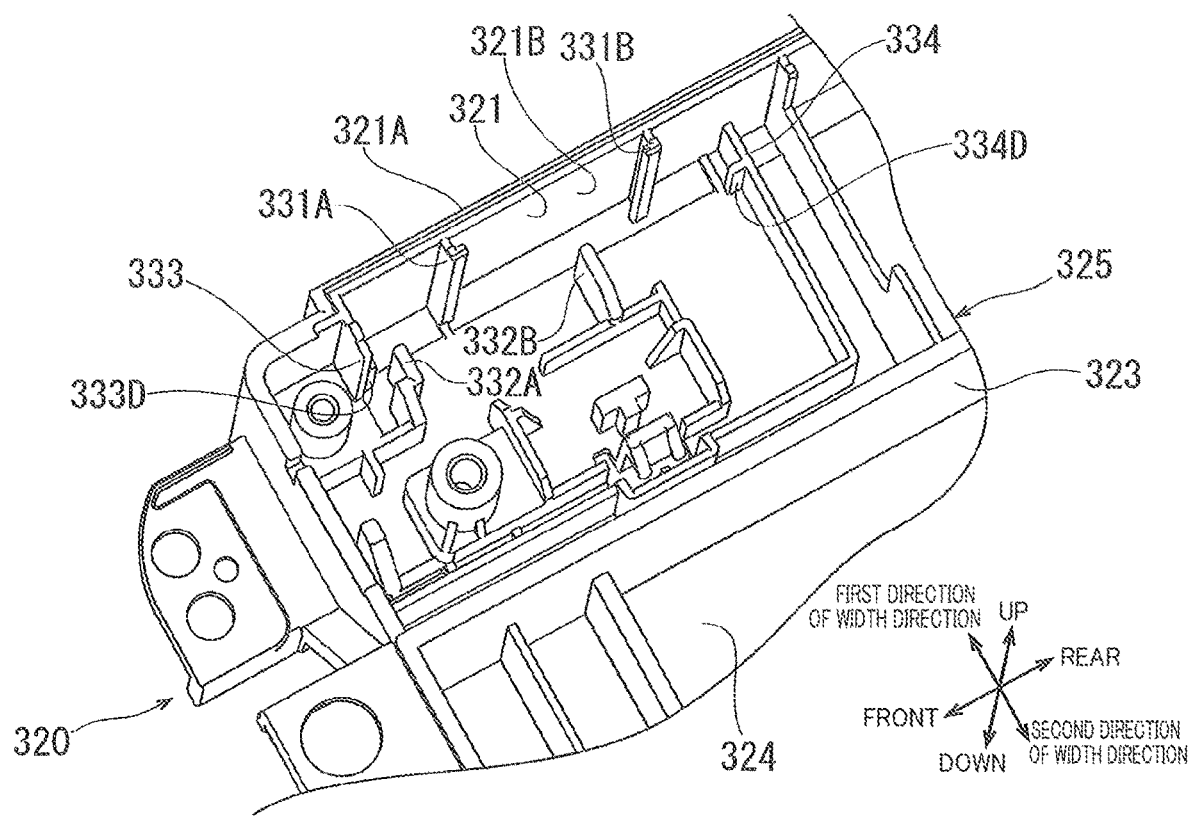
FIG. 11 is a partial perspective view as similar to FIG. 10 mainly illustrating the first to fourth ribs in a state in which the communication circuit board is removed.

First Rib, Second Rib, Third Rib and Fourth Rib Holding Communication Circuit Board As illustrated in FIG. 11, the second housing 320 includes the first ribs 331A, 331B, the second ribs 332A, 332B, the third rib 333, and the fourth rib 334. The first ribs 331A, 331B, the second ribs 332A, 332B, the third rib 333, and the fourth rib 334 are formed on the scanner base 325 as one body.

The first rib 331A protrudes from the inner face 321B of the first side-wall 321 in the second direction of the width direction and extends in the up and down direction.

The first rib 331B protrudes, in the second direction of the width direction, from the inner face 321B of the first side-wall 321 at a position spaced rearward apart from the first rib 331A and extends in the up and down direction.

The second rib 332A protrudes upward from the bottom wall 324 at a position spaced apart from the first ribs 331A, 331B in the second direction of the width direction by a thickness of the communication circuit board 372.

The second rib 332B protrudes upward from the bottom wall 324 at a position spaced rearward apart from the second rib 332A and spaced apart from the first ribs 331A, 331B in the second direction of the width direction by the thickness direction of the communication circuit board 372.

The third rib 333 protrudes, in the second direction of the width direction, from the first side-wall 321 at a position spaced frontward apart from the first ribs 331A, 331B, and the second ribs 332A, 332B and extends in the up and down direction.

The fourth rib 334 protrudes, in the second direction of the width direction, from the first side-wall 321 at a position spaced rearward apart from the first ribs 331A, 331B and the second ribs 332A, 332B and spaced rearward apart from the third rib 333 by a length of the communication circuit board 372 in the front and rear direction and extends in the up and down direction.

As illustrated in FIG. 10, the communication circuit board 372 is moved downward toward the first ribs 331A, 331B, the second ribs 332A, 332B, the third rib 333, and the fourth rib 334 from an upper side of the second housing 320.

Then, the first ribs 331A, 331B come into contact with the first circuit board surface 372A of the communication circuit board 372 opposed to the inner face 321B of the first side-wall 321. The second ribs 332A, 332B come into contact with the second circuit board surface 372B of the communication circuit board 372 facing opposite to the first circuit board surface 372A.

The third rib 333 comes into contact with an front end of the communication circuit board 372. In this situation, a small rib 333D protruding rearward from the third rib 333 comes into contact with a lower part of the front end of the communication circuit board 372 from a second side thereof in the width direction.

The fourth rib 334 comes into contact with a rear end of the communication circuit board 372. In this situation, a small rib 334D protruding frontward from the fourth rib 334 comes into contact with a lower part of the rear end of the communication circuit board 372 from the second side thereof in the width direction.

As a result, the communication circuit board 372 is held by the first ribs 331A, 331B and the second ribs 332A, 332B in the width direction, and the communication circuit board 372 is held by the third rib 333 and the fourth rib 334 in the front and rear direction. Accordingly, in the MFP 300, the communication circuit board 372 can be easily mounted to the second housing 320, and the communication antenna 372C of the communication circuit board 372 is positioned accurately with respect to the mark 321M of the first side-wall 321.

Effects

In the embodiment of the MFP 300, the second housing 320 accommodating the image reading unit 302 including the voluminous reading sensor 302S and the moving mechanism 302T illustrated in FIG. 7 and FIG. 8 is greatly larger than the operation panel 380 accommodating the thin input/output portion 380A and the panel circuit board 378 illustrated in FIG. 4.

As a result, there is a possibility that the first side-wall 321 located on the first side than the reading sensor 302S in the width direction becomes large in the front and rear direction and the up and down direction. Accordingly, in the MFP 300, it is possible to find a large area in the inner face 321B of the first side-wall 321 to which the communication circuit board 372 is opposed.

Accordingly, in the embodiment of the MFP 300, there is no need to excessively downsize the communication circuit board 372, and it is possible to increase the design flexibility of the communication circuit board 372.

Moreover, in the MFP 300, since a size of the communication circuit board 372 located at a rear of the operation panel 380 does not affect the operation panel 380, it is possible to prevent upsizing of the operation panel 380.

Moreover, in the MFP 300, as illustrated in FIG. 6, the operation panel 380 is located at the position nearer to the first side-wall 321 than the center CL1 in the second housing 320 in the width direction. According to this configuration, a standing position of the user when the user operates the operation panel 380 in front of the MFP 300 becomes close to or the same as a standing position of the user when the user brings the communication object 399 close to the mark 321M by hand in front of the MFP 300 illustrated in FIG. 5. Accordingly, it is possible to improve the convenience to the user.

Moreover, in the MFP 300, as illustrated in FIG. 6, the communication circuit board 372 is located between the first side-wall 321 and the movement area R1 of the reading sensor 302S in the width direction. As illustrated in FIG. 8, when viewed in the width direction, the upper part of the communication circuit board 372 overlaps the front part of the reading sensor 302S each other. As a result of this configuration, it is possible to downsize the MFP 300 by effectively using a space between the first side-wall 321 and the movement area R1 of the reading sensor 302S.

Moreover, in the MFP 300, as illustrated in FIG. 6 and FIG. 7, the second housing 320 is capable of shielding electromagnetic waves by the shield member 373 located between the reading sensor 302S and the communication circuit board 372. As a result of this configuration, since it is possible to prevent the noise generated by the communication circuit board 372 from reaching the reading sensor 302S, deterioration of reading quality of the reading sensor 302S can be suppressed.

Moreover, in the MFP 300, as illustrated in FIG. 6, the first range A1 occupied by the communication circuit board 372 in the front and rear direction is spaced frontward apart from the second range A2 occupied by the motor 302M in the front and rear direction. The third range A3 occupied by the communication circuit board 372 in the width direction is spaced in the first direction of the width direction apart from the fourth range A4 occupied by the motor 302M in the width direction. As a result of this configuration, since it is possible to prevent the noise generated by the motor 302M from reaching the communication circuit board 372, communication fault of the communication circuit board 372 can be suppressed.

Moreover, in the MFP 300, as illustrated in FIG. 7, the communication circuit board 372 is located below the third part 353 of the conveyance guide 350. As a result of this configuration, it is possible to downsize the MFP 300 by effectively using a space below the third part 353.

Moreover, in the MFP 300, as illustrated in FIG. 4, the operation panel 380 includes the panel circuit board 378. The image forming unit 305 includes the main circuit board 371. The MFP 300 further includes the first cable 372FC and the second cable 378FC. If the communication circuit board 372 and the main circuit board 371 are connected by one cable, there is a possibility that the signal level of communicating information between the communication circuit board 372 and the main circuit board 371 decreases due to increase of the resistance value of said one cable which is relatively long. Regarding this point, in the MFP 300, the communication circuit board 372, the main circuit board 371 and the panel circuit board 378 are connected by the first cable 372FC and the second cable 378FC. As a result of this, it is possible to suppress the increase of the resistance value by connecting the communication circuit board 372 and the panel circuit board 378 by the first cable 372FC which is relatively short. Moreover, in the panel circuit board 378, the first cable 372FC can supply power again. Accordingly, in the MFP 300, it is possible to suppress the decrease of the signal level of communicating information between the communication circuit board 372 and the main circuit board 371.

Moreover, in the MFP 300, as illustrated in FIG. 11, the second housing 320 includes the two first ribs 331A, 331B, the two second ribs 332A, 332B, the third rib 333, and the fourth rib 334. As a result of this configuration, as illustrated in FIG. 10, it is possible to hold the communication circuit board 372 by the first ribs 331A, 331B and the second ribs 332A, 332B in the width direction by moving downward toward the first ribs 331A, 331B, the second ribs 332A, 332B, the third rib 333, and the fourth rib 334 from the upper side of the second housing 320, It is possible to hold the communication circuit board 372 by the third rib 333 and the fourth rib 334 in the front and rear direction by moving downward toward the first ribs 331A, 331B, the second ribs 332A, 332B, the third rib 333, and the fourth rib 334 from the upper side of the second housing 320. As a result, in the MFP 300, it is possible to easily mount the communication circuit board 372 to the second housing 320, and the communication antenna 372C of the communication circuit board 372 is positioned accurately with respect to the mark 321M of the first side-wall 321.

Moreover, in the MFP 300, as illustrated in FIG. 2 and FIG. 3, the first housing 310 includes the front opening 310H and the front cover 317. As a result of this configuration, since the MFP 300 is a configuration of, what is called, a front access, the user can perform various operations with respect to the image forming unit 305 when standing in front of the MFP 300. At this time, the standing position of the user when operating in front of the MFP 300 becomes close to or the same as the standing position of the user when the user brings the communication object 399 close to the mark 321M by hand in front of the MFP 300 illustrated in FIG. 5. Accordingly, it is possible to improve the convenience to the user.

Moreover, in the MFP 300, as illustrated in FIG. 3, the image forming unit 305 forwardly discharges the sheet on which the image is formed from the rear side of the first housing 310, and causes the after-image-forming-discharge tray 319 to support the discharged sheet. As a result of this configuration, since the MFP 300 is a configuration of, what is called, a front access, the user can pulls out the sheet supported by the after-image-forming-discharge tray 319 when standing in front of the MFP 300. At this time, the standing position of the user when pulling out the sheet in front of the MFP 300 becomes close to or the same as the standing position of the user when the user brings the communication object 399 close to the mark 321M by hand in front of the MFP 300 illustrated in FIG. 5. Accordingly, it is possible to improve the convenience to the user.

Moreover, in the MFP 300, as illustrated in FIG. 2, the first side-wall 321 of the second housing 320 is located at the first side, in the width direction, of the end portion 310L of the first housing 310 located at the first end of the first housing 310 in the first direction of the width direction. That is, the first-side-wall 321 is located at the outer position than the end portion 310L in the width direction. As a result of this configuration, since the second housing 320 protrudes outward than the first housing 310 in the width direction, that is, the second housing 320 protrudes in the first direction of the width direction than the first hosing 310, it is possible to prevent the first housing 310 from obstructing the user when bringing the communication object 399 close to the mark 321M.

Moreover, in the MFP 300, as illustrated in FIG. 4, the communication circuit board 372 and the mark 321M are located in front of the center CL2 of the first side-wall 321 in the front and rear direction. More specifically, the communication circuit board 372 and the mark 321M are located near the front end of the first side-wall 321. As a result of this configuration, it is possible to easily bring the communication object 399 close to the mark 321M when the user just expands his hand rearward from the position when operating the operation panel 380.

As described above, there has been explained the present disclosure by the embodiment, however, the present disclosure is not limited to the above described embodiment, and may be embodied with various changes and modifications, which may occur to those skilled in the art, without departing from the spirit and scope of the disclosure.

In the embodiment, the inner face 321B of the first side-wall 321 is opposed to the communication circuit board 372, and the outer face 321A of the first side-wall 321 includes the mark 321M, however, the present disclosure is not limited to this configuration. For example, the first direction and the second direction of the width direction in the embodiment are inverted, an inner face of the second side-wall 322 may be opposed to the communication circuit board 372, and an outer face of the second side-wall 322 may include a mark similar to the mark 321M. The present disclosure includes these configurations.

In the embodiment, the discharge tray 359 is located below the supply tray 358, however, the present disclosure is not limited this configuration. For example, the discharge tray may be located above the supply tray.

In the embodiment, the MFP 300 includes the automatic document feeder 340, however, the present disclosure is not limited this configuration. For example, the MFP 300 may include a document cover configured to cover a document placed on the document-supporting surface 302A of the second housing 320 in place of the automatic document feeder 340. The present disclosure includes this configuration.

In the embodiment, the first ribs 331A, 331B and the second ribs 332A, 332B are respectively a plurality of ribs, however, the present disclosure is not limited to this configuration. At least one of the first ribs and the second ribs may be one rib.

In the embodiment, the first side-wall 321 is a wall shape extending along the front and rear direction and the up and down direction, that is, orthogonal to a horizontal plane, however, the present disclosure is not limited to this configuration. For example, the first side-wall may incline with respect to the horizontal plane such that an upper end of the first side-wall is located on a second side than a lower end of the first side-wall in the second direction of the width direction. The first side-wall may be a wall shape in which an outer face of the first side-wall faces slightly upward. Moreover, the first side-wall may incline with respect to the horizontal plane such that the upper end of the first side-wall is located on a first side than the lower end of the first side-wall in the first direction of the width direction. The first side-wall may be a wall shape in which the outer face of the first side-wall faces slightly downward. In these cases, it is preferable that the communication circuit board is disposed along an inner surface of the first side-wall.

In the embodiment, the operation panel 380 is located on the first side, in the first direction of the width direction, of the center CL1 of the second housing 320 in the width direction, however, the present disclosure is not limited to this configuration. For example, a length of the operations panel in the width direction may be the same as a length of the second housing in the width direction. Moreover, the operation panel may be located at a center of the second housing in the width direction, and the length of the operation panel in the width direction may be less than the length of the second housing in the width direction.

In the embodiment, the communication circuit board 372 and the main circuit board 371 are connected by the first cable 372FC, the panel circuit board 378, and the second cable 378FC, however, the present disclosure is not limited to this configuration. For example, the communication circuit board and the main circuit board are directly connected by a cable not via the panel circuit board.

Second Embodiment

Figure 12:
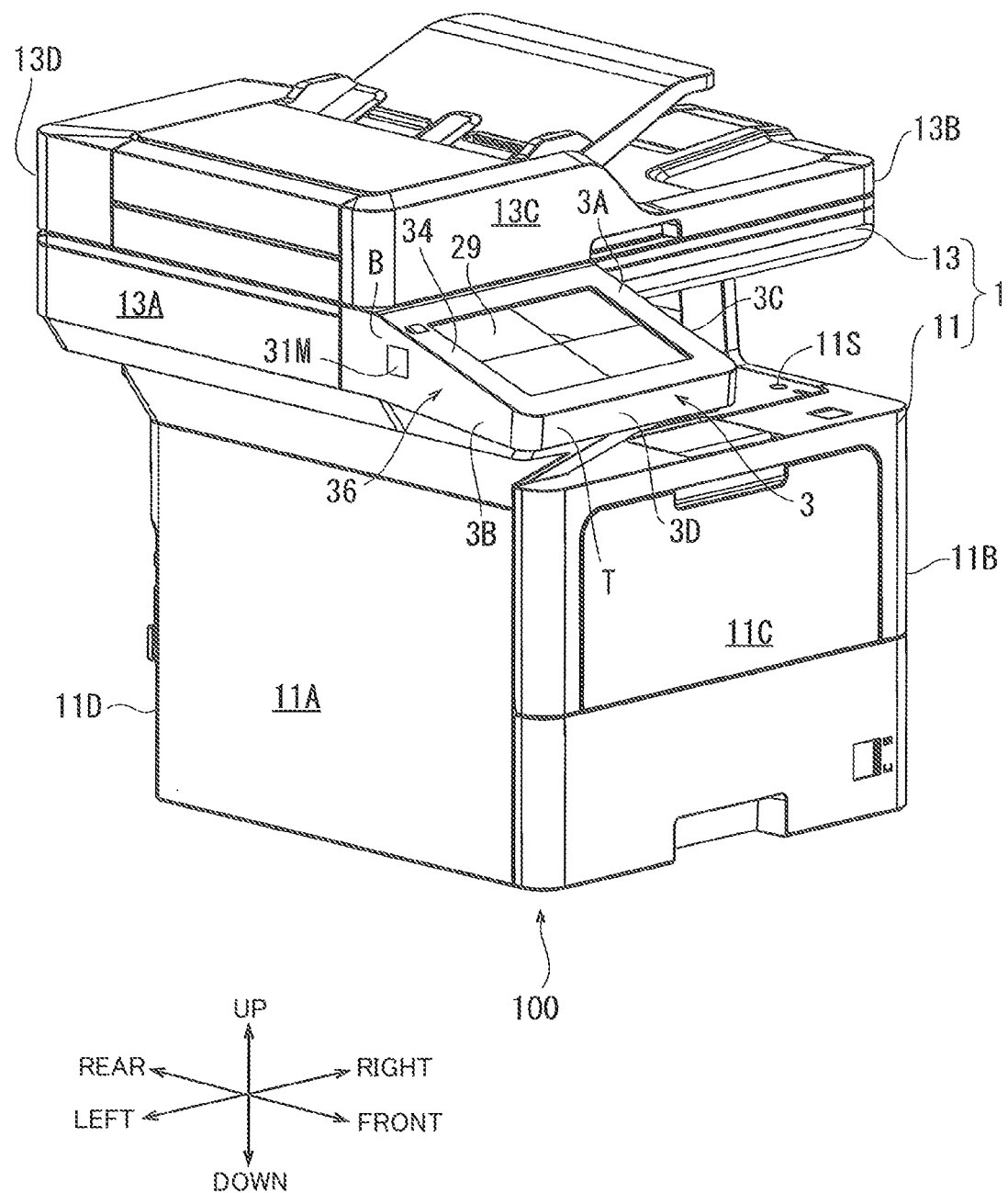
FIG. 12 is an overall perspective view of an embodiment of a MFP.

There will be described a second embodiment of the present disclosure with reference to the drawings. As illustrated in FIG. 12, the second embodiment of a MFP (Multifunction Peripheral) 100 is an example of an image forming apparatus of the present disclosure. In FIG. 12, a user's side standing in front of a housing 1 is defined as a front side of the MFP 100, a right side of the MFP 100 when viewed from the user standing in front of the MFP 100 is defined as a right side. As a result, a forward direction, a rearward direction, a rightward direction, a rearward direction, an upward direction and a downward direction are displayed. Then, each of the directions illustrated in FIG. 14 or later corresponds to each of the directions illustrated in FIG. 12.

As illustrated in FIG. 12, the MFP 100 includes the housing 1 and an operation panel 3. The housing 1 includes a first housing 11 having a substantially rectangular parallelepiped shape and a second housing 13 shaped substantially like a box and provided on the first housing 11.

Figure 13:
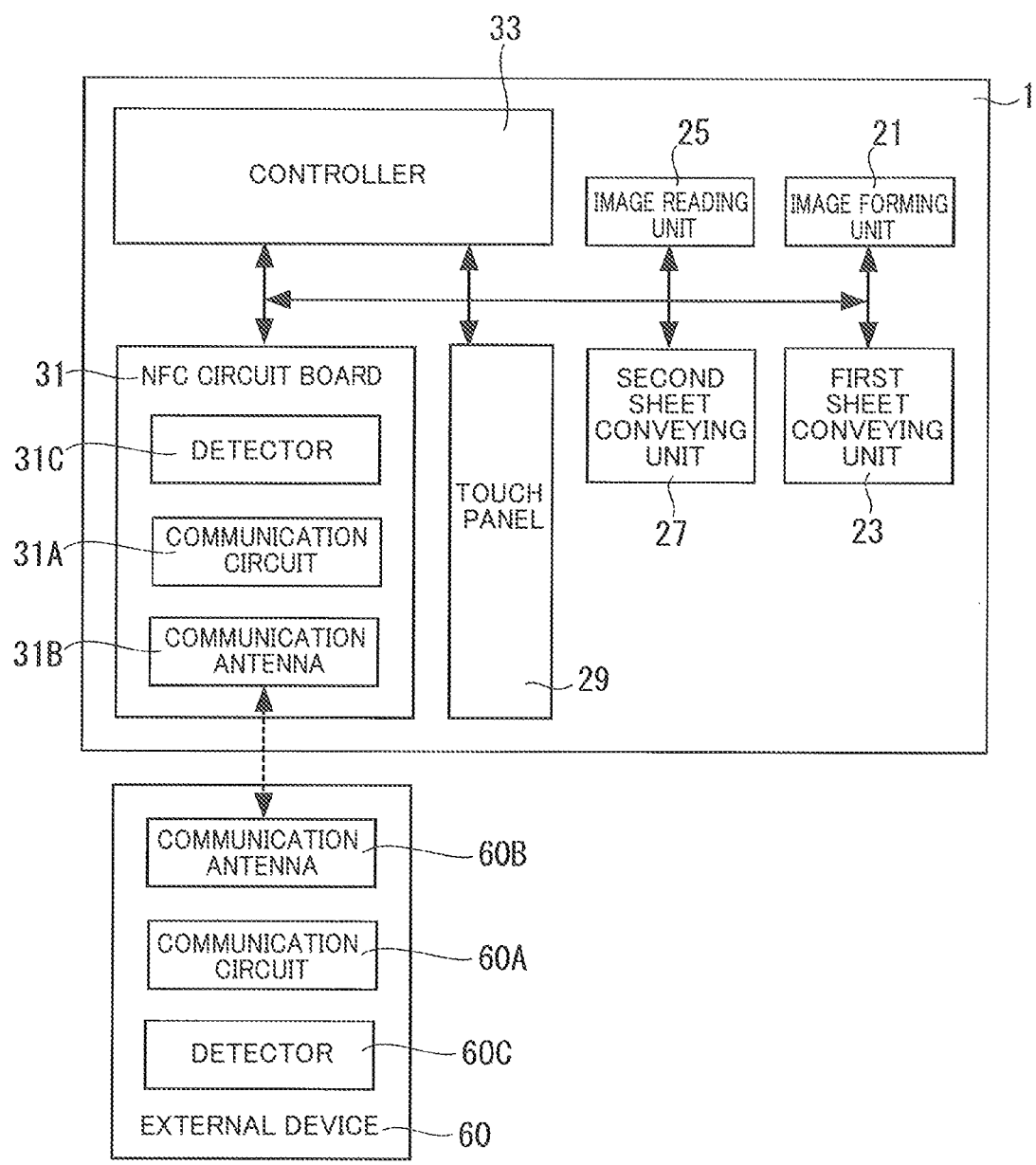
FIG. 13 is a block diagram of the embodiment of the MFP and an external device.

In the first housing 11, an image forming unit 21 illustrated in FIG. 13 and a first sheet conveying unit 23 is accommodated. The image forming unit 21 is configured to form an image on a sheet conveyed by the first sheet conveying unit 23 by an electro-photographic method. As illustrated in FIG. 12, the first housing 11 includes a first left-side-face 11A located at a left end of the first housing 11 in a left and right direction and adjacent to the image forming unit 21 in the left and right direction, a first right-side-face 11B located at a right end of the first housing 11 in the left and right direction and adjacent to the image forming unit 21 in the left and right direction, a front-side-face IC located at a front end of the first housing 11 in a front and rear direction and adjacent to the image forming unit 21 in the front and rear direction, and a rear-side-face 11D located at a rear end of the first housing 11 in the front and rear direction and adjacent to the image forming unit 21 in the front and rear direction.

Each of the first left-side-face 11A, the first right-side-face 11B, the front-side-face IC, and the rear-side-face 11D extends in a vertical direction, that is, extends in the up and down direction. The first left-side-face 11A is orthogonal to the front-side-face 11C, and the first left-side-face 11A is orthogonal to the rear-side-face 11D. The first right-side-face 11B is orthogonal to the front-side-face IC, and the first right-side-face 11B is orthogonal to the rear-side-face 11D. As a result, the first left-side-face 11A is parallel to the first right-side-face 11B, and the front-side-face 11C is parallel to the rear-side-face 11D. The first left-side-face 11A is an example of a first side-face, the first right-side-face 11B is an example of a second side-wall. Moreover, a power switch 11S is provided at a right end on an upper surface of the first housing 11.

In the second housing 13, an image reading unit 25 illustrated in FIG. 13 and a second sheet conveying unit 27 is accommodated. The image reading unit 25 is configured to read images on a document placed on a flat bed of the image reading unit 25 or conveyed in the image reading unit 25 by the second sheet conveying unit 27. As illustrated in FIG. 12, the second housing 13 includes a second left-side-face 13A located at a left end of the second housing 13 in the left and right direction, a second right-side-face 13B located at a right end of the second housing 13 in the left and right direction and adjacent to the image reading unit 25 in the left and right direction while extending in the up and down direction and the front and rear direction, a second front-side-face 13C located at a front end of the second housing in the front and rear direction and adjacent to the image reading unit 25 in the front and rear direction, and a second rear-side-face 13D located at a rear end of the second housing 13 in the front and rear direction and adjacent to the image reading unit 25 in the front and rear direction.

Each of the second left-side-face 13A, the second right-side-face 13B, the second front-side-face 13C, and the second rear-side-face 13D extends in the vertical direction, that is, extends in the up and down direction. The second left-side-face 13A is orthogonal to the second front-side-face 13C, and the second left-side-face 13A is orthogonal to the second rear-side-face 13D. The second right-side-face 13B is orthogonal to the second front-side-face 13C, and the second right-side-face 13B is orthogonal to the second rear-side-face 13D. As a result, the second left-side-face 13A is parallel to the second right-side-face 13B, and the second front-side-face 13C is parallel to the second rear-side-face 13D. The second left-side-face 13A is an example of a third side-wall, and the second right-side-face 13B is an example of a fourth side-wall.

Figure 16:
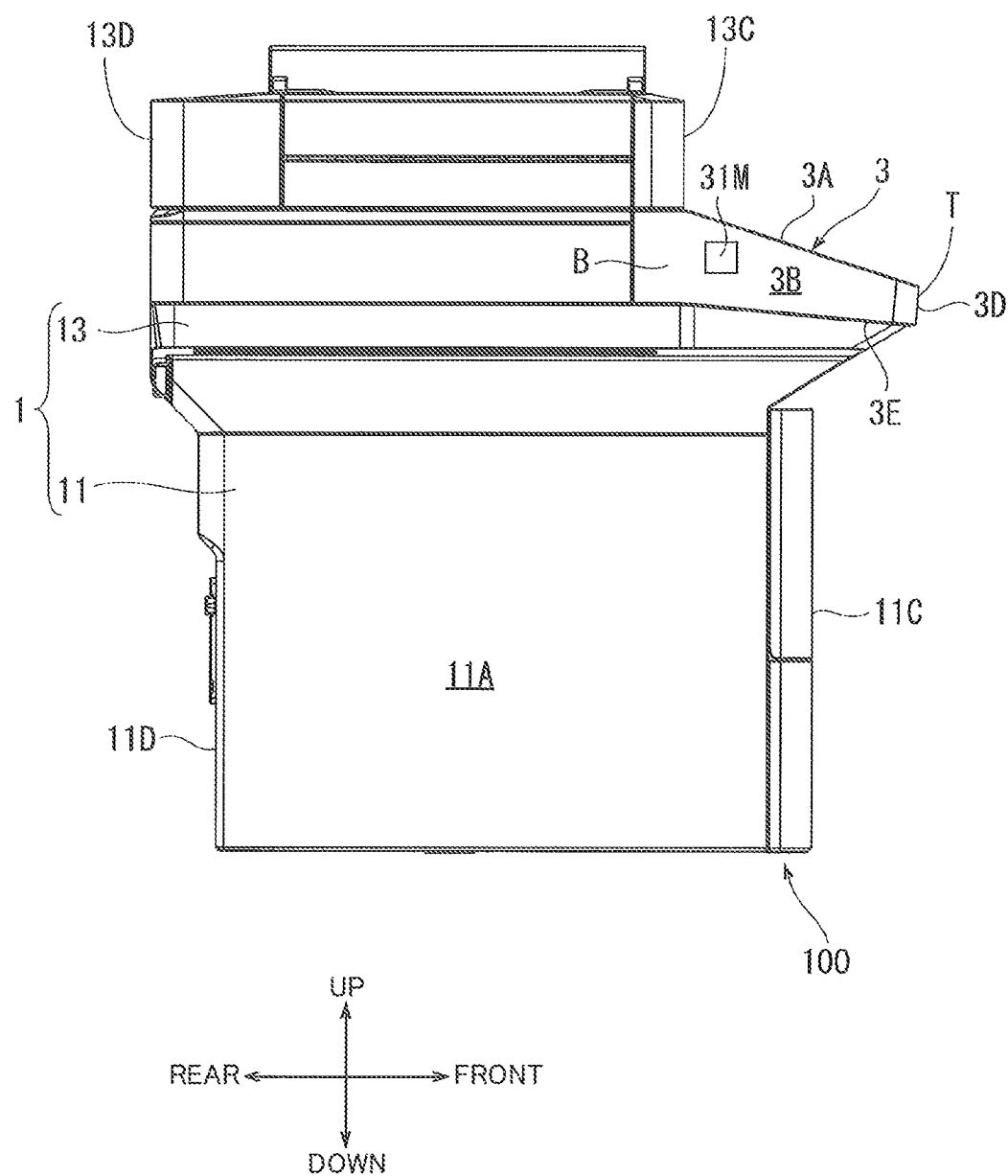
FIG. 16 is a side elevational view of the embodiment of the MFP.

The operation panel 3 is connected to the second housing 13. As illustrated in FIG. 16, the operation panel 3 protrudes frontward, at the left end of the second housing 13, toward a user standing in front of the second housing 13, and a distal end of the operation panel 3 is nearer to the user than the second housing 13. The operation panel 3 is located at a position opposite to the power switch 11S in the front and rear direction.

As illustrated in FIG. 17, the operation panel 3 is configured by engaging a first cover 30 and a second cover 32 each formed of resin with each other, and a touch panel 29 and a NFC circuit board 31 are provided in the operation panel 3. The touch panel 29 is a device into which a display and a switch are integrated, and configured to receive various operations from a user by touch of the user on a surface of the touch panel 29. The touch panel 29 is an example of an operation unit.

More specifically, a reinforcement plate 39 made of metal is fixed onto a third cover 35 in the operation panel 3. The reinforcement plate 39 extends to a distal end T of the operation panel 3 protruding from a base end B of the operation panel 3 located near the second housing 13 to the distal end T, and reinforces the operation panel 3. The reinforcement plate 39 is an example of a reinforcement member.

A circuit-board-mount plate 41, a LCD (Liquid Crystal Display) holding plate 43, and a touch-panel holder 45 are fixed to the first cover 30 above the reinforcement plate 39. An operation circuit board 47 and a shield plate 49 are fixed to the circuit-board-mount plate 41, and a LCD 51 is held by the LCD holding plate 43. The first cover 30 includes an upper frame 34 in which an opening 30A having a rectangular shape is formed, and the upper frame 34 covers a periphery of the touch panel 29. The LCD 51 is located just below the touch panel 29. The LCD holding plate 43 is located at the periphery of the touch panel 29, and eliminates static electricity intruding through a space between the touch panel 29 and an upper frame of the first cover 30. The LCD holding plate 43 is an example of a static eliminator.

Moreover, the first cover 30 includes a left side-wall 36. The left side-wall 36 is an example of a panel-side-wall. The NFC circuit board 31 is supported by the left side-wall 36. The NFC circuit board 31 is located so as to be opposed to the left side-wall 36. The reinforcement plate 39 is not in contact with the NFC circuit board 31.

A wire spring 53 is provided at a position near the position at which the left side-wall 36 and the second cover 32 are engaged with each other. A distance L2 from the position at which the left side-wall 36 and the second cover 32 are engaged with each other to the wire spring 53 is less than a distance L1 from the position at which the left side-wall 36 and the second cover 32 are engaged with each other to the NFC circuit board 31. The wire spring 53 extends downward below the NFC circuit board 31, then extends upward at a rear of the NFC circuit board 31, and is connected to a metal frame, which is not illustrated, in the second housing 13. The wire spring 53 eliminates static electricity intruding from the position at which the left side-wall 36 and the second cover 32 are engaged with each other such that the static electricity does not reach the NFC circuit board 31. The wire spring 53 is an example of a metal wire.

As illustrated in FIG. 13, the NFC circuit board 31 includes a communication circuit 31A, a loop-shaped communication antenna 31B capable of the NFC communication by being connected to the communication circuit 31A, and a detector 31C configured to detect whether the NFC communication via the communication antenna 31B is executed by being connected to the communication circuit 31A. The NFC circuit board 31 is an example of a communication circuit board. The communication antenna 31B is formed on a circuit board surface 31F of the NFC circuit board 31.

A controller 33 is provided in the first housing 11. The controller 33 is configured as a microcomputer mainly constituted by a CPU, a ROM, a RAM, and connected to a storage, which is not illustrated. The ROM stores programs for controlling various operations of the MFP 100 by the CPU and the like. The RAM is used as a storage area in which data and signals used when the CPU executes the programs are temporary stored or an operating area of a data process. The controller 33 is connected to the image forming unit 21, the first sheet conveying unit 23, the image reading unit 25, the second sheet conveying unit 27, the touch panel 29, and the NFC circuit board 31 via a control bus.

An external device 60 such as a smart phone possessed by the user includes a communication circuit 60A, a loop-shaped communication antenna 60B capable of the NFC communication by being connected to the communication circuit 60A, a detector 60C configured to detect whether the NFC communication via the communication antenna 60B is executed by being connected to the communication circuit 60A.

The operation panel 3 includes a first surface 3A which is an upper surface of the upper frame 34 and the touch panel 29 of the first cover 30, a second surface 3B which is a left surface of the left side-wall 36 of the first cover 30, a third surface 3C which is a right surface of a right side-wall of the first cover 30, a fourth surface 3D which is a front surface of a front side-wall of the first cover 30, and a fifth surface 3E which is a lower surface of the second cover 32.

Figure 14:
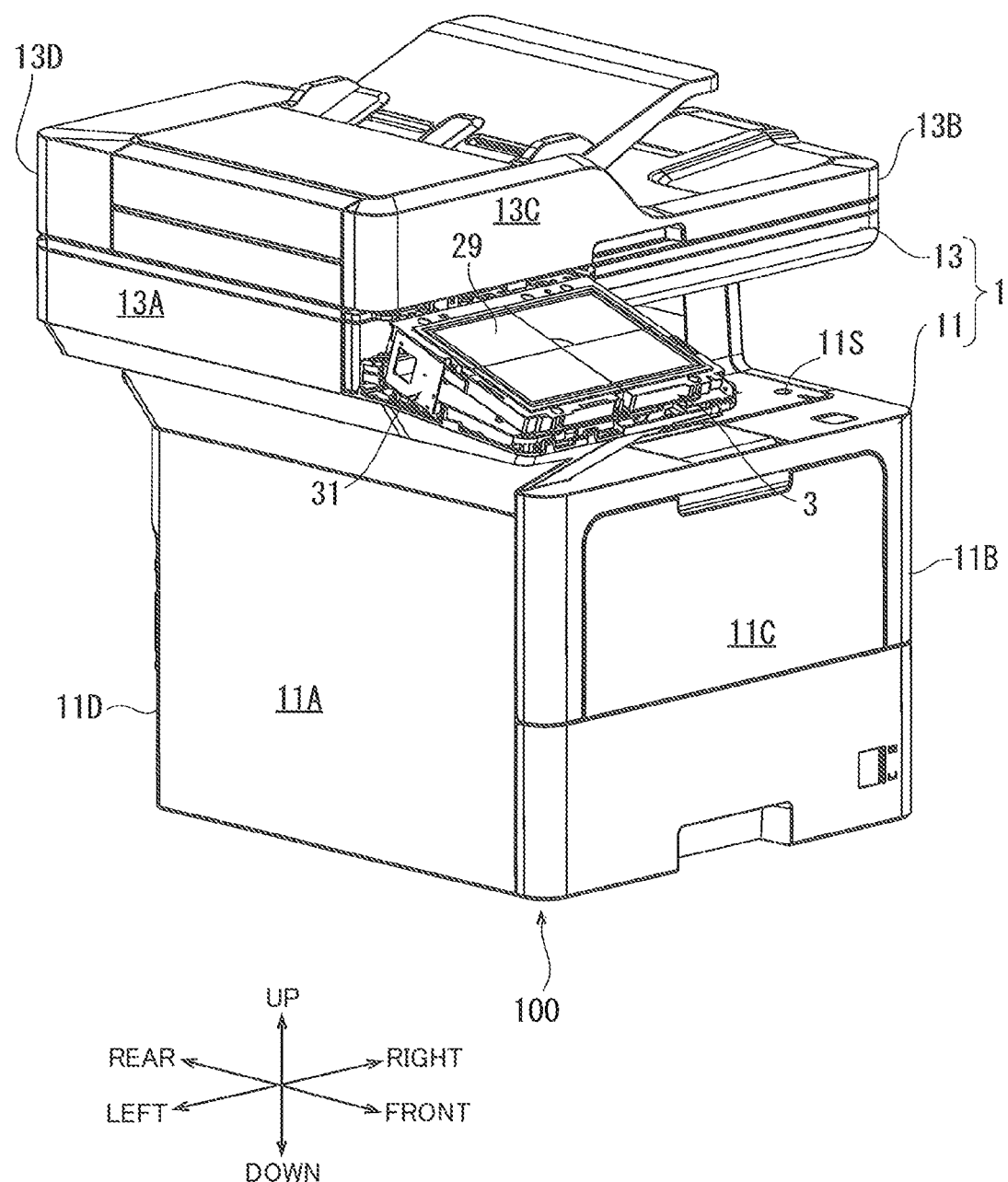
FIG. 14 is a perspective view of the embodiment of the MFP in a state in which a first cover is removed.
Figure 15:
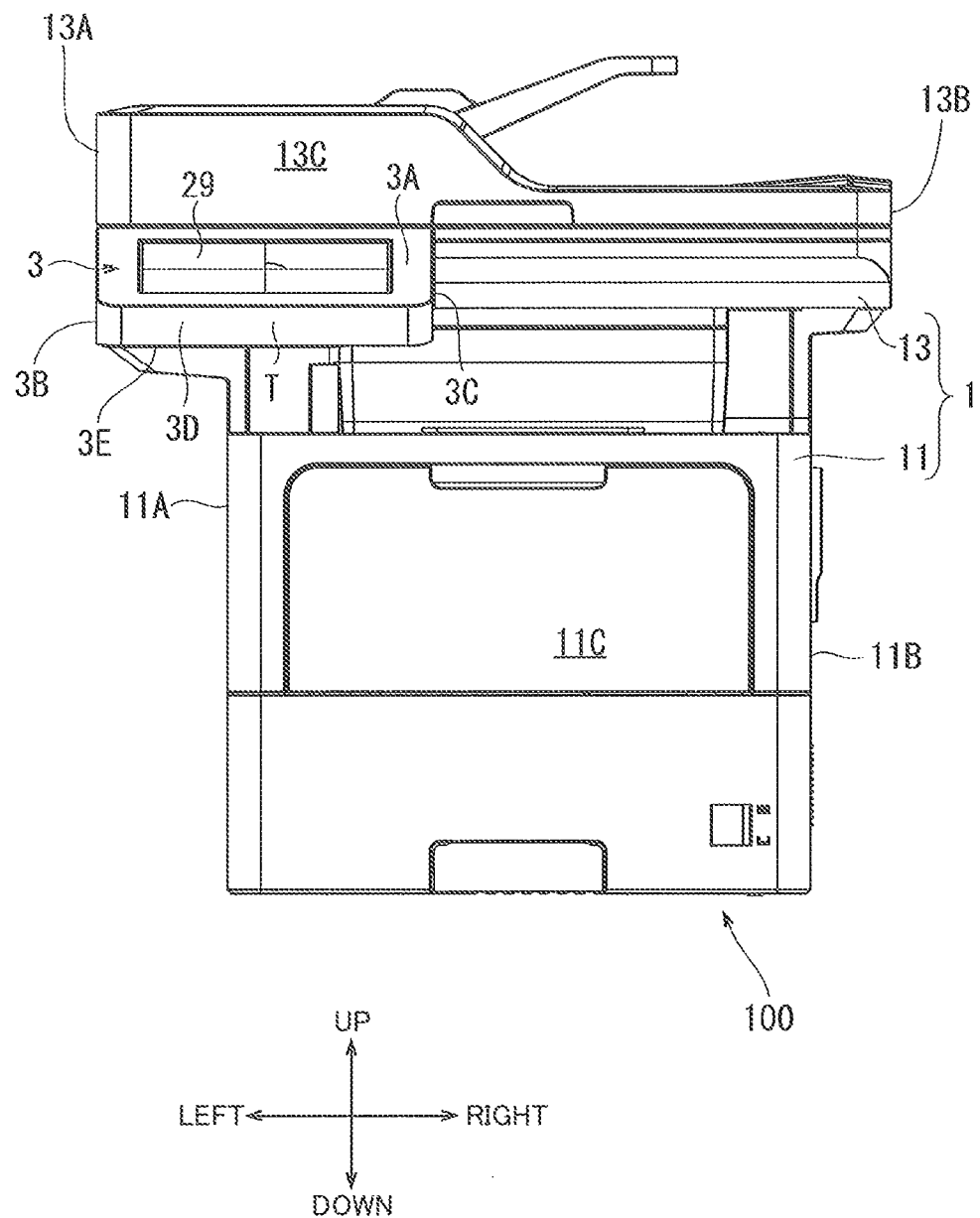
FIG. 15 is a front elevational view of the embodiment of the MFP.

As illustrated in FIG. 12, FIG. 14, and FIG. 15, the first surface 3A faces upward and inclines so as to be lower at its front portion than its rear portion. The second surface 3B faces leftward, the third surface 3C extends in the vertical direction so as to face rightward, and the fourth surface 3D extends in the vertical direction so as to face frontward. The fifth surface 3E faces downward and inclines so as to be lower at its front portion than its rear portion. Especially, as illustrated in FIG. 16, an inclined angle of the first surface 3A with respect to a horizontal plane is greater than an inclined angle of the fifth surface 3E with respect to the horizontal plane.

As a result, a width of the second surface 3B of the operation panel 3 in the up and down direction increases toward the base end B located near the second housing 13 from the protruding distal end T. A mark 31M indicating a position of the communication antenna 31B of the NFC circuit board 31 is formed at an area nearer to the base end B than to the distal end T in the second surface 3B.

Moreover, as illustrated in FIG. 15, the second housing 13 and the operation panel 3 protrudes leftward than the first housing 11 such that a left end of the second housing 13 and a left end of the operation panel 3 are located on a left side than a left end of the first housing 11. Accordingly, the second surface 3B of the operation panel 3 is located on an outer side than the first left-side-face 11A of the first housing 11. Moreover, the base end B of the operation panel 3 is connected to the second housing 13 such that the second left-side-face 13A and the second surface 3B are approximately aligned with each other in the up and down direction.

In the MFP 100 configured as explained above, the user can operate the image forming unit 21 and the image reading unit 25 via the touch panel 29 of the operation panel 3. Moreover, in the MFP 100, since the mark 31M to which the external device 60 is brought close is formed on the second surface 3B, the user can bring the own external device 60 close to the mark 31M without hesitation, and hold the external device 60 to the mark 31M, or bring the external device 60 into contact with the second surface 3B of the operation panel 3 on which the mark 31M is provided. As a result of this, the user executes communication between the communication antenna 60B of the external device 60 and the communication antenna 31B of the NFC circuit board 31, and, for example, the user can form an image, based on the data stored in the external device 60, on the sheet by the image forming unit 21. It is noted that other operations such as a certification with respect to the owner of the external device 60 may be executed by communication between the communication antenna 60B of the external device 60 and the communication antenna 31B of the NFC circuit board 31.

Here, in the MFP 100, the operation panel 3 includes the first surface 3A and the second surface 3B approximately orthogonal to each other. And, the width of the second surface 3B in the up and down direction increases toward the base end B located near the second housing 13 from the protruding distal end T. Moreover, the operation panel 3 includes the mark 31M, indicating the position of the communication antenna 31B to which the external device 60 is brought close, formed at the area nearer to the base end B than to the distal end T in the second surface 3B. The width of the base end B is greater than the width of the distal end T in the up and down direction. Accordingly, it is possible to suppress upsizing of the operation panel 3. Moreover, there is no need for excessively downsizing the NFC circuit board 31, and it is possible to increase the design flexibility of the NFC circuit board 31.

Especially, in the MFP 100, it is possible to suppress upsizing the operation panel 3 in comparison with a case where the width of the second surface 3B in the up and down direction from the distal end T to the base end B becomes wide throughout, while appropriately securing high stiffness of the operation panel 3. Moreover, since there is no necessary space on the first surface 3A on which the NFC circuit board 31 is placed, it is possible to suppress upsizing the first surface 3A.

Moreover, in the MFP 100, the operation panel 3 protrudes from the second housing 13 in the front and rear direction, and the second surface 3B of the operation panel 3 is located on the outer side than the first left-side-face 11A of the first housing 11 in the left and right direction. Accordingly, it is easy to bring the external device 60 close to the base end B of the second surface 3B of the operation panel 3, and it is possible to easily execute the NFC communication between the NFC circuit board 31 and the external device 60.

Moreover, in the MFP 100, the base end B of the operation panel 3 is connected to the second housing 13 such that the second left-side-face 13A of the second housing 13 and the second surface 3B of the operation panel 3 are approximately aligned with each other in the up and down direction. Accordingly, it is easier to bring the external device 60 close to the base end B of the second surface 3B, and it is possible to more easily execute the communication between the NFC circuit board 31 and the external device 60.

Moreover, in the MFP 100, the circuit board surface 31F of the NFC circuit board 31 is located so as to be opposed to the left side-wall 36 of the first cover 30. Accordingly, it is easy to face the communication antenna 31B outward, and it is possible to execute appropriate communication between the communication antenna 60B of the external device 60 and the communication antenna 31B of the NFC circuit board 31.

Moreover, in the MFP 100, the reinforcement plate 39 and the NFC circuit board 31 are not into contact with each other. As a result of this, it is possible to suppress influence of the reinforcement plate 39 with respect to communication between the external device 60 and the NFC circuit board 31, and it is possible to suppress influence of static electricity to the touch panel 29.

Moreover, in the MFP 100, the static electricity applied to the NFC circuit board 31 can be eliminated by the wire spring 53. Accordingly, it is possible to suppress the influence of the static electricity to the NFC circuit board 31, and it is possible to suppress the influence with respect to the communication between the external device 60 and the NFC circuit board 31.

As described above, there has been described the present disclosure based on the embodiment, however, the present disclosure is not limited to the above described embodiment, and may be embodied with various changes and modifications, which may occur to those skilled in the art, without departing from the spirit and scope of the disclosure.

For example, in the embodiment, the operation panel 3 protrudes frontward at the left end of the second housing 13, however, the operation panel 3 may protrude forward on a right side in the second housing 13.

As the external device, an IC card and the like other than the smart phone may be adopted. Moreover, the operation unit is configured to receive operations by the user, and this is not limited to the touch panel 29, and the operation unit may be an operation switch formed independently from a display, and the like.

In the present disclosure, "being approximately orthogonal to" is not limited to intersecting at 90 degrees. For example, "being approximately orthogonal to" preferably corresponds to intersecting at a range from 80 degrees to 110 degrees, or, corresponds to intersecting at a range from 45 degrees to 135 degrees. Moreover, in the present disclosure, "being approximately aligned with each other" includes a situation in which the third side-face and the second face are completely aligned with each other, and includes a situation in which there is a slight step between the third side-face and the second face resulted from manufacturing tolerance.

Third Embodiment

There will be described an image forming apparatus 510 of the third embodiment of the present disclosure as an example of an image forming apparatus. In the following description, as illustrated in FIG. 18, a state in which the image forming apparatus 510 is placed so as to be usable is a reference state, a side to which a sheet tray 523 is pulled out is a front side, a side opposite to the front side is a rear side, a left and right direction is defined when viewed from the front side of the image forming apparatus 510, further, a side in the image forming apparatus 510 on which an upper housing 501 is located is defined as an upper side, and a side in the image forming apparatus 510 on which a lower housing 502 is located is defined as a lower side. The left and right direction when viewed from the front side of the image forming apparatus 510 is a width direction of the image forming apparatus 510.

Configuration of Image Forming Apparatus

As illustrated in FIG. 1 to FIG. 3, the image forming apparatus 510 of the present embodiment includes the upper housing 501, the lower housing 502, and a coupling housing 503. Each of the upper housing 501, the lower housing 502 and the coupling housing 503 has an approximately rectangular parallel-piped shape. It is noted that the lower housing 510 is an example of a first housing, and the upper housing 501 is an example of a second housing.

The upper housing 501 is provided above the coupling housing 503 so as to cover an upper face of the coupling housing 503. The upper housing 501 includes an upper-side main body 511, a document press unit 512, an ADF (Automatic Document Feeder) 513, and an operation panel 514.

The upper housing 501 includes an upper-front side wall 5011 having an upper-front side face 501A, an upper-left side wall 5012 having an upper-left side face 501B, and an upper-right side wall 5013 having an upper-right side face 501C. The upper-front side face 501A is constituted by a front side-wall located at a front end of the upper-side main body 511 in the front and rear direction and a front side-wall located at a front end of the document press unit 512 in the front and rear direction. The upper-left side face 501B is constituted by a left side wall located at a left end of the upper-side main body 511 in the left and right direction and a left side-wall located at a left end of the document press unit 512 in the left and right direction. The upper-right side face 501C is constituted by a right side-wall located at a right end of the upper-side main body 511 in the left and right direction and a right side-wall located at a right end of the document press unit 512 in the left and right direction. Each of the upper-front side face 501A, the upper-left side face 501B and the upper-right side face 501C extends in a vertical direction. The upper-front side face 501A is an example of a vertical wall.

Figure 20:
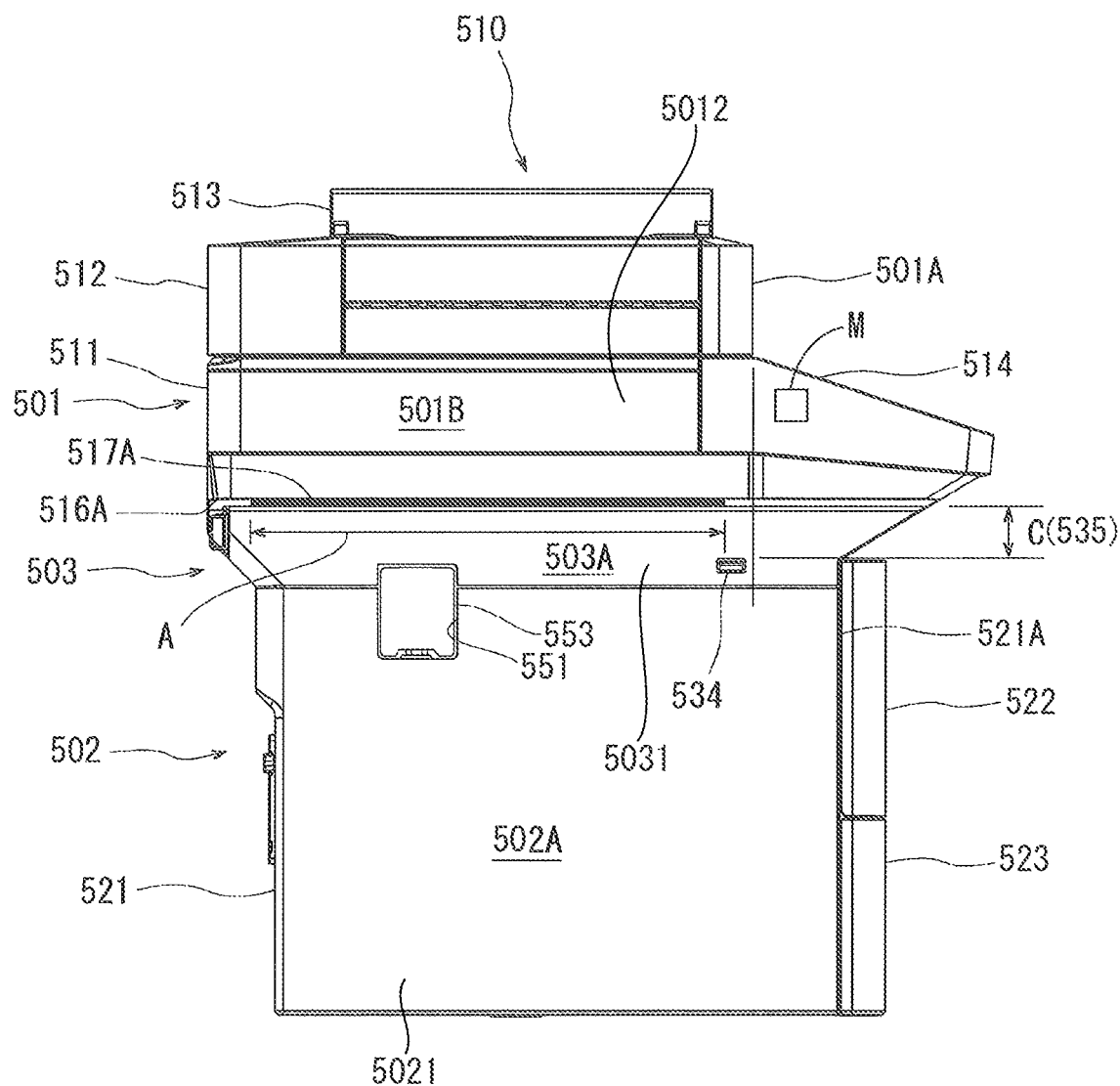
FIG. 20 is a left side elevational view of the embodiment of the image forming apparatus.
Figure 21:
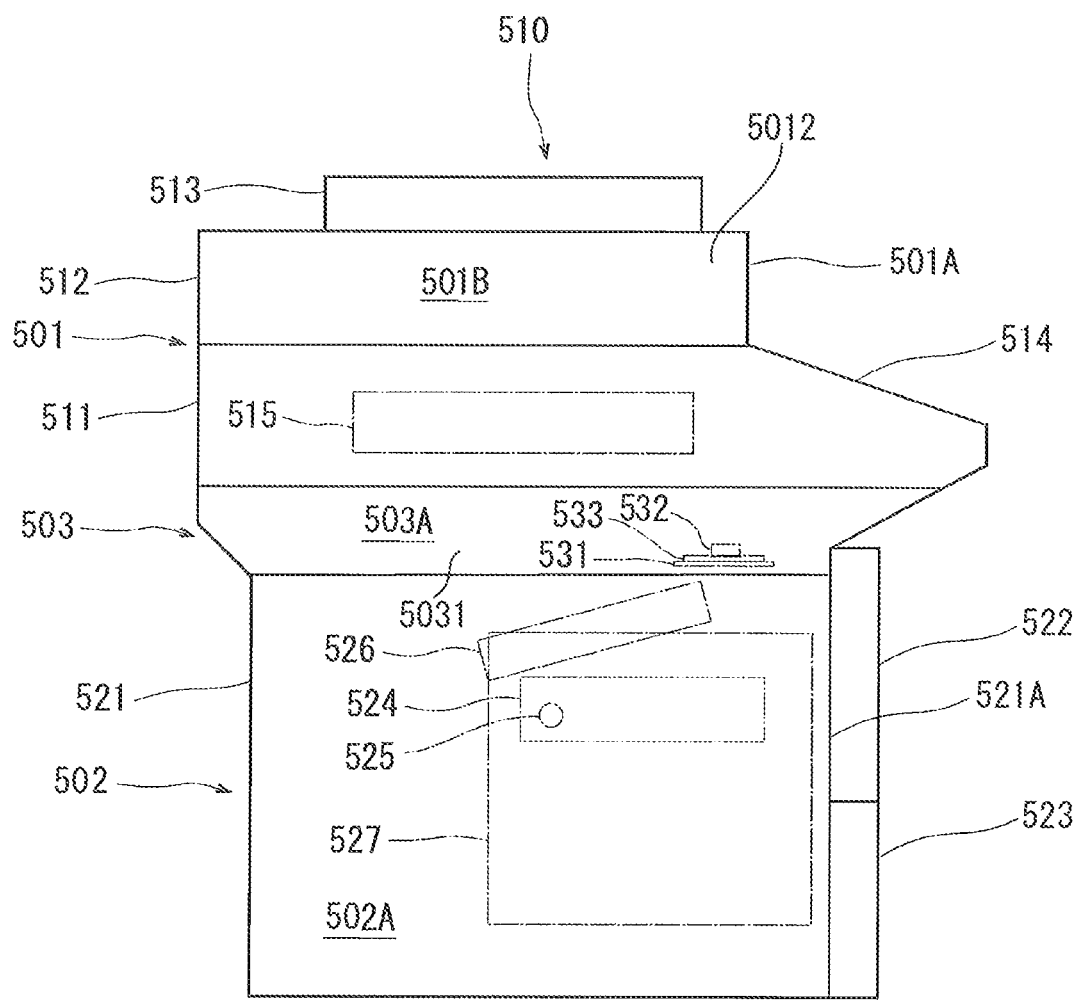
FIG. 21 is a left side elevational view of the embodiment of the image forming apparatus schematically illustrating a positional relationship among a circuit-board holding drive roller held by a lower housing, an exposing unit, and a circuit-board holding USB in a height direction.

As illustrated in FIG. 21, the upper-side main body 511 accommodates an image reading unit 515 configured to read an image on a document. The document press unit 512 is an approximately rectangular-parallel shaped housing, and is provided above the upper-side main body 511 so as to cover an upper face of the upper-side main body 511. A rear part of the document press unit 512 is coupled to the upper-side main body 511 such that a front part of the document press unit 512 is pivotable upward and downward with respect to the upper-side main body 511. The document press unit 512 is provided with the ADF 513 on an upper side of the document press unit 512. The operation panel 514 is a panel protruding from the upper-side main body 511 so as to be located in front of the upper-front side face 501A, and includes a touch panel, operation buttons and the like for operating the image forming apparatus 510. It is noted that, as illustrated in FIG. 20, a mark M to which an external device is to be brought close when the short-distance wireless communication is executed is formed on a left side-wall of the operation panel 514. This mark M indicates a position corresponding to a position of a communication antenna of a communication circuit board disposed in the operation panel 514 configured to communicate between the image forming apparatus 510 and the external device.

The lower housing 502 includes a lower-side main body 521, an open/close cover 522 and the sheet tray 523.

The lower housing 502 includes a lower-left side wall 5021 having a lower-left side face 502A. The lower-left side face 502A is constituted by a left side-wall located at a left end of the lower-side main body 521 in the left and right direction. The lower-left side face 502A extends in the vertical direction.

The lower-side main body 521 includes an opening 521A through which access from an outside to an inside of the image forming apparatus 510 is available provided at a front end part of the lower-side main body 521. The open/close cover 522 opens/closes an upper part of the opening 521A when an upper part of the open/close cover 522 pivots in the front and rear direction with respect to the lower-side main body 521. The sheet tray 523 opens/closes a lower part of the opening 521A when the sheet tray 523 reciprocates in the front and rear direction with respect to the lower-side main body 521.

As illustrated in FIG. 21, the lower-side main body 521 accommodates an image forming unit 524 configured to form an image on a sheet S. The image forming unit 524 includes a drive roller 525 and an exposing unit 526. The drive roller 525 is supported by a driving-roller holding plate 527 accommodated in the lower-side main body 521. A configuration of the image forming unit 524 is not limited to this configuration, and may be adopted by an electro-photographic method, an ink-jet method, a thermal-head method, and the like.

Figure 22:
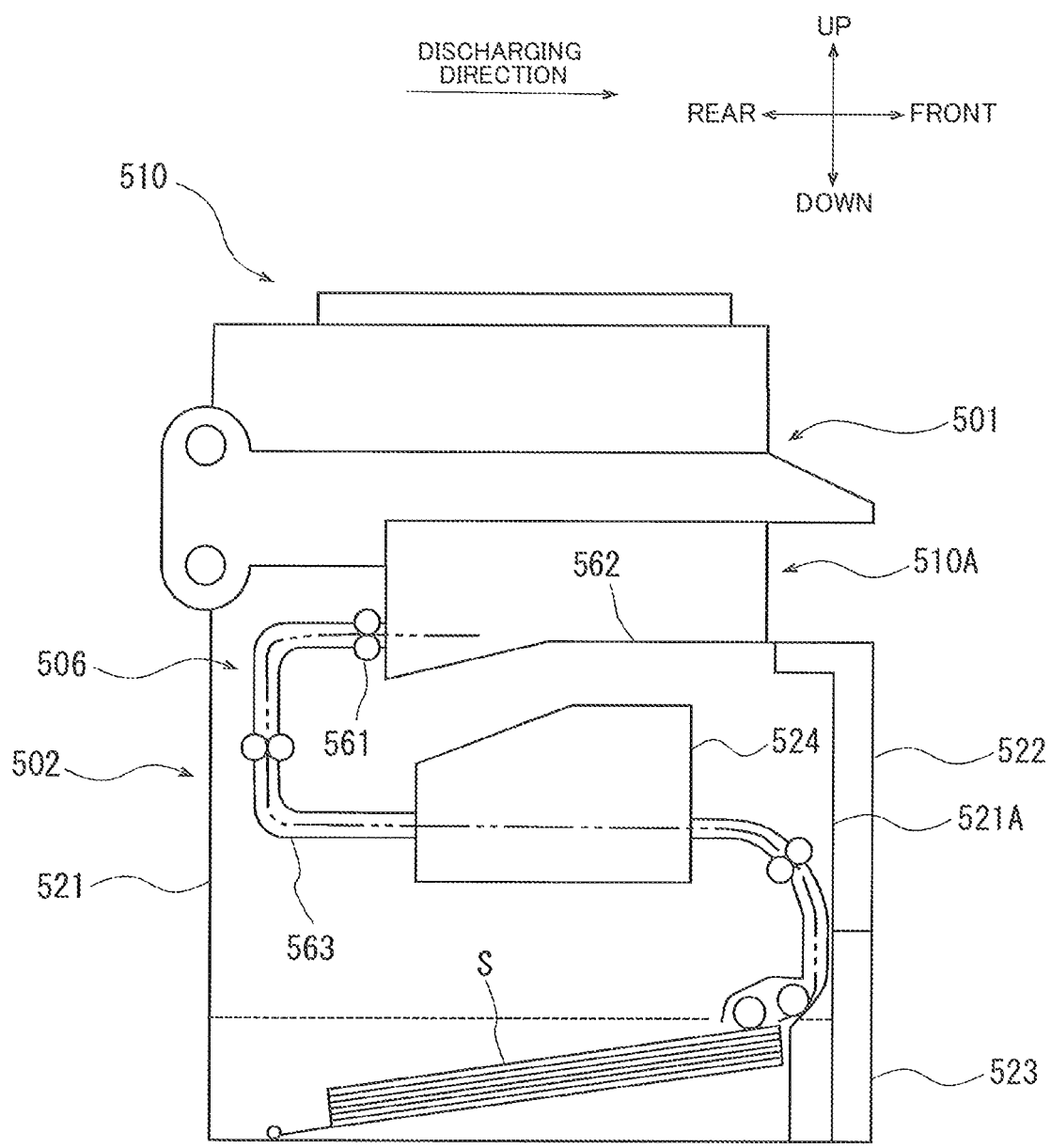
FIG. 22 is a schematic side elevational view illustrating overall inner configurations of the embodiment of the image forming apparatus.

As illustrated in FIG. 22, the lower-side main body 521 accommodates a sheet conveyance mechanism 506 configured to convey the sheet S from the sheet tray 523 toward an outside of the lower housing 502. The sheet conveyance mechanism 506 includes a sheet discharging roller 561, a discharge tray 562, and a conveyance path 563 connecting from the sheet tray 523 to the discharge tray 562 via the image forming unit 524. The image forming apparatus 510 is provided with a sheet ejection port 510A at a front part thereof, as an opening, between an upper face of the lower housing 502 and a lower face of the upper housing 501. The discharge tray 562 is formed on the upper face of the lower housing 502, and is inclined upward so as to be higher at its front portion than its rear portion. The sheet conveyance mechanism 506 includes a plurality of pairs of conveying rollers in the conveyance path 563, and the sheet discharging roller 561 at a downstream end portion of the conveyance path 563. The discharge tray 562 is located downstream of the sheet discharging roller 561 in a discharging direction, and the sheet discharging roller 561 discharges the sheet S on the discharge tray 562. In the present disclosure, a direction in which the sheet discharging roller 561 discharges the sheet S toward the discharge tray 562 is defined as the discharging direction. The discharging direction is a direction from the rear side toward the front side of the image forming apparatus 510 in FIG. 18, FIG. 20, and FIG. 21.

The coupling housing 503 couples the upper housing 501 and the lower housing 502. The coupling housing 503 is coupled to the lower housing 502 on an upper side of the lower housing 502 so as to cover the upper face of the lower housing 502. As illustrated in FIG. 21, the coupling housing 503 accommodates a USB-circuit-board holding plate 531. The USB-circuit-board holding plate 531 holds a USB circuit board 533 including a USB terminal 532.

The coupling housing 503 includes a coupling left side wall 5031 having a coupling left side face 503A located at a left end of the coupling housing 503 in the left and right direction, and a coupling right side wall 5032 having a coupling right side face 503B located at a right end of the coupling housing 503 in the left and right direction. Each of the coupling left side face 503A and the coupling right side face 503B extends in the vertical direction. The coupling left side face 503A is an example of a third side-wall, and the coupling right side face 503B is an example of a fourth side-wall. The coupling left side face 503A and the lower-left side face 502A are located at an identical position in the left and right direction of the image forming apparatus 510. The coupling left side face 503A is a face extending upward from the lower-left side face 502A. The coupling housing 503 includes a coupling left first face 503C which is a face continuing from the coupling left side face 503A and facing approximately downward. The coupling housing 503 further includes a coupling left second face 503D which is a face continuing from the coupling left first face 503C, facing approximately leftward, and coupling to a lower end on a left side of the upper housing 501.

As illustrated in FIG. 18 and FIG. 19, each of the upper housing 501, the coupling left first face 503C and the coupling left second face 503D of the coupling housing 503 protrudes to a left side of the coupling left side face 503A in the width direction. That is, each of left ends of the upper housing 501, the coupling left first face 503C and the coupling left second face 503D of the coupling housing 503 is located leftward than the coupling left side face 503A in the width direction. A protruding portion 516 is constituted by the upper housing 501, the coupling left first face 503C and the coupling left second face 503D of the coupling housing 503. As illustrated in FIG. 20, the coupling left first face 503C corresponding to a lower face 516A of the protruding portion 516 includes a grabbed portion 517A grabbed by fingers of a user. The grabbed portion 517A is formed by a plurality of ribs. That is, the plurality of ribs each extending in the front and rear direction are arranged in the left and right direction at a left edge portion of the coupling left first face 503C. The grabbed portion 517A is formed within a range indicated by an arrow A in FIG. 20. The grabbed portion 517A continuously extends forward from a position near a rear end of the coupling housing 503 in the front and rear direction to a position near the upper-front side face 501A in the front and rear direction of the image forming apparatus 510.

Moreover, as illustrated in FIG. 19, the coupling housing 503 includes a coupling right first face 503E which is a face continuing from the coupling right side face 503B and facing approximately downward. The coupling housing 503 further includes a coupling right second face 503F which is a face continuing from the coupling right first face 503E, facing approximately rightward, and coupling to a lower end on a right side of the upper housing 501. The coupling right first face 503E includes a grabbed portion 517B grabbed by fingers of the user. The grabbed portion 517B continuously extends forward from the position near the rear end of the coupling housing 503 in the front and rear direction to the position near the upper-front side face 501A in the front and rear direction of the image forming apparatus 510 that is the same as the range of the grabbed portion 517A.

As illustrated in FIG. 19 and FIG. 20, the coupling left side face 503A includes a USB opening 534 into which a USB device 504 is inserted. That is, the USB opening 534 is formed on the coupling left side face 503A such that the USB terminal 532 formed on the USB circuit board 53, which is located in the USB opening 534, is exposed. The USB opening 534 is an example of a first opening. As the USB device 504, though not limited to, for example, a USB memory may be adopted. The USB opening 534 is located below the protruding portion 516. The USB device 504 is located on a right side than the upper-left side face 501B in the left and right direction of the image forming apparatus 510 in a state in which the USB device 504 is inserted into the USB opening 534 and connected to the USB terminal 532. Specifically, a left end of the USB device 504 is spaced rightward apart from the upper-left side face 501B by a distance indicated by an arrow B in FIG. 19 in the left and right direction of the image forming apparatus 510 in a state in which the USB device 504 is inserted into the USB opening 534 and connected to the USB terminal 532. That is, an upper side of the USB opening 534 which is in the state in which the USB device 504 is inserted into the USB opening 534 and connected to the USB terminal 532 is covered by the protruding portion 516.

As illustrated in FIG. 20, the USB opening 534 is located on a front side than a center of the coupling housing 503 and on a rear side than the upper-front side face 501A of the upper housing 501 in the front and rear direction of the image forming apparatus 510. In other words, the USB opening 534 is located at a position upstream of the upper-front side face 501A in the discharging direction in the coupling left side face 503A. Moreover, the grabbed portion 517A is located above the USB opening 534. Specifically, a front end of the grabbed portion 517A is located on a front side than a rear end of the USB opening 534 in the front and rear direction of the image forming apparatus 510. An up-and-down-direction space 535 which allows fingers of the user to take in and take out of is formed between the grabbed portion 517A and the USB opening 534. A dimension of the up-and-down-direction space 535 is a range indicated by an arrow C in FIG. 20.

Figure 23:
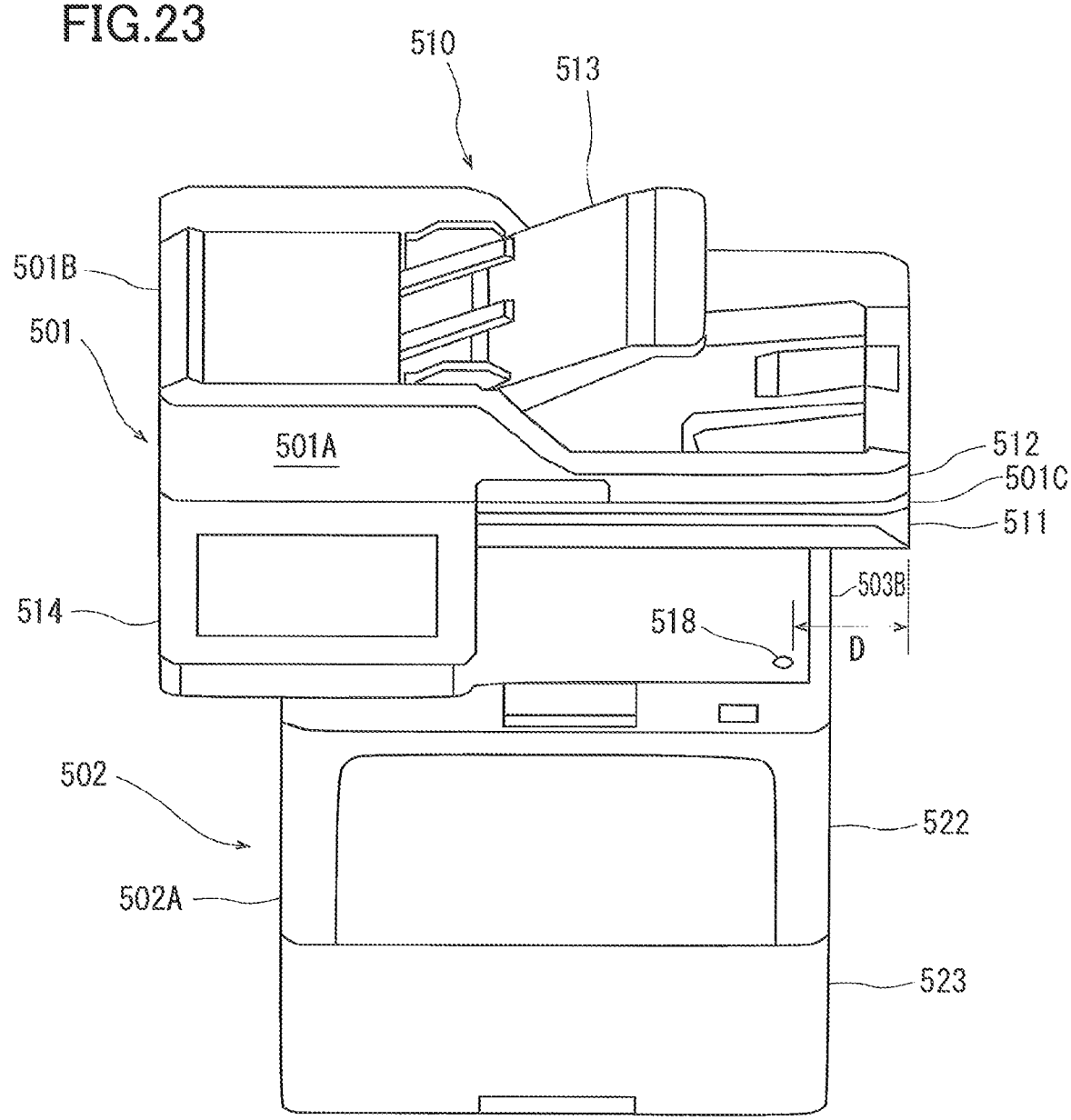
FIG. 23 is a perspective view of the embodiment of the image forming apparatus schematically illustrating a positional relationship among an upper housing, the operation panel, and a power switch when viewed from a obliquely upper side.

A power switch 518 of the image forming apparatus 510 is disposed on the upper face of the lower housing 502. The power switch 518 is located below the upper housing 501. As illustrated in FIG. 23 and FIG. 25, the power switch 518 is located at a position nearer to the coupling right side face 503B than a center of the image forming apparatus 510 in the left and right direction, and located on a left side than the upper-right side face 501C in the left and right direction of the image forming apparatus 510. Specifically, a right end of the power switch 518 is spaced leftward apart from the upper-right side face 501C in the left and right direction of the image forming apparatus 510 by a distance indicated by an arrow D in FIG. 23. Moreover, the power switch 518 is located at a position such that the power switch 518 does not overlap the operation panel 514 in a plan view. As illustrated in FIG. 24 and FIG. 25, the power switch 518 is located on a rear side than the upper-front side face 501A in the front and rear direction of the image forming apparatus 510. Specifically, a front end of the power switch 518 is located at a position spaced rearward apart from the upper-front side face 501A by a distance indicated by an arrow E in FIG. 24 in the front and rear direction of the image forming apparatus 510.

Figure 26:
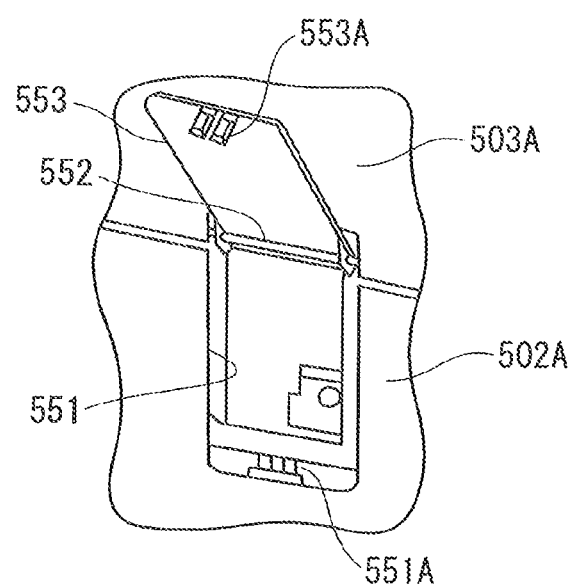
FIG. 26 is a partial perspective view of the embodiment of the image forming apparatus schematically illustrating a state in which a cover provided at a first side wall for opening/closing an add-on-circuit-board opening is open.

As illustrated in FIG. 18 and FIG. 20, an add-on-circuit-board opening 551 into which an add-on-circuit-board is inserted is formed on the lower-left side face 502A of the lower housing 502 and the coupling left side face 503A of the coupling housing 503. The add-on-circuit board opening 551 is an example of a second opening. As illustrated in FIG. 26, the add-on-circuit-board opening 551 is opened and closed by a cover 553 configured to pivot around a rotation shaft 552 disposed at an upper end of the add-on-circuit-board opening 551. An engaged portion 551A is provided at a lower end of the add-on-circuit-board opening 551. The cover 553 includes an engaging portion 553A capable of engaging/disengaging with/from the engaged portion 551A. The engaging portion 553A engages with the engaged portion 551A by downward pivotal movement of the cover around the rotation shaft 552 by its own weight of the engaging portion 553A. The engagement between the engaging portion 553A and the engaged portion 551A is released when the user pulls up a lower end of the cover 553. It is noted that the cover 553 is an example of a third cover.

Effects

In the image forming apparatus 510 explained above, since the USB opening 534 is located below the protruding portion 516 of the upper housing 501, the upper side of the USB device 504 which has been inserted into the USB opening 534 is covered by the protruding portion 516. Accordingly, it is possible to reduce influence from an outside to the USB opening 534 by the protruding portion 516 located above the USB opening 534.

Accordingly, according to the image forming apparatus 510, it is possible to suppress occurrences of problems in which liquid intrudes into the USB opening 534 or the USB device 504 which has been inserted into the USB opening 534 is contacted by something such as a person or an object.

Moreover, it is possible to secure space for mounting the USB device 504 between the USB opening 534 and a wall of a room, even if the image forming apparatus 510 is placed at a position near the wall of the room.

In the image forming apparatus 510, the up-and-down-direction space 535 which allows the fingers of the user to take in or take out of is formed between the grabbed portion 517A and the USB opening 534. According to this configuration, even if the USB device 504 has been inserted into the USB opening 534, the user can grab the grabbed portion 517A by passing the fingers of the user through the up-and-down-direction space 535. Accordingly, it is possible to prevent the USB device 504 from obstructing movement of the image forming apparatus 510. It is noted that when the user pulls up the image forming apparatus 510, the user pulls it up by grabbing the grabbed portion 517A and the grabbed portion 517B.

In the image forming apparatus 510, the USB opening 534 is located on the front side than the center of the image forming apparatus 510 in the front and rear direction. According to this configuration, since a distance from the user standing in front of the image forming apparatus 510 to the USB opening 534 becomes short, the user standing in front of the image forming apparatus 510 can easily insert the USB device 504 into the USB opening 534.

In the image forming apparatus 510, the USB opening 534 is located on the rear side than the upper-front side face 501A of the upper housing 501. According to this configuration, since the user can recognize that the USB opening 534 is located on the rear side than the upper-front side face 501A by referring the upper-front side face 501A of the upper housing 501, it is possible to easily insert the USB device 504 into the USB opening 534.

In the image forming apparatus 510, the USB circuit board 533 is located above the driving-roller holding plate 527 accommodated in the lower housing 502. According to this configuration, it is possible to prevent grease and foreign matters existing around the drive roller 525 held by the driving-roller holding plate 527 from reaching the USB circuit board 533.

In the image forming apparatus 510, the USB-circuit-board holding plate 531 holding the USB circuit board 533 is accommodated in the coupling housing 503. According to this configuration, since the USB-circuit-board holding plate 531 is accommodated in the coupling housing 503 which is different from the upper housing 501 accommodating the image reading unit 515 and the lower housing 502 accommodating the image forming unit 524, it is possible to reduce an adverse effect, such as transmission of vibrations, exerted from the image reading unit 515 and the image forming unit 524 to the USB circuit board 533.

In the image forming apparatus 510, the USB circuit board 533 is located above the exposing unit 526. According to this configuration, it is possible to reduce an adverse effect, such as powdered paper, exerted to the USB circuit board 533 located above the exposing unit 526.

In the image forming apparatus 510, the power switch 518 is located below the upper housing 501. The power switch 518 is located on the left side than the upper-right side face 501C of the upper housing 501 in the left and right direction of the image forming apparatus 510 and located on the rear side than the upper-front side face 501A of the upper housing 501 in the front and rear direction of the image forming apparatus 510. According to this configuration, since the upper side of the power switch 518 is covered by the upper housing 501, it is possible to suppress problems in which liquid pours on the power switch 518.

In the image forming apparatus 510, the power switch 518 is located on the side nearer to the coupling right side face 503B than the center of the image forming apparatus 510 in the left and right direction and located on the left side than the upper-right side face 501C of the upper housing 501. Moreover, the power switch 518 is located at the position which does not overlap the operation panel 514 in plan view. According to this configuration, since the power switch 518 is spaced apart from the operation panel 514, it is possible to prevent the user from mistakenly pushing the power switch 518 when the user operates the operation panel 514.

In the image forming apparatus 510, the coupling left side face 503A includes the add-on-circuit-board opening 551 and the cover 553 configured to open and close the add-on-circuit-board opening 551 by pivoting around the rotation shaft 552 disposed at the upper end of the add-on-circuit-board opening 551. According to this configuration, since the cover 553 pivots around the rotation shaft 552 disposed at the front end of the add-on-circuit-board opening 551, the add-on-circuit-board opening 551 is closed by the own weight of cover 553, even if the cover 553 is forgotten to be closed. Accordingly, it is possible to reduce an adverse effect to a device performance due to a change of an air flow caused by the cover 553 that is forgotten to be closed.

As described above, there has been the present disclosure according to the embodiment, however, the present disclosure is not limited to the above described embodiment, and may be embodied with various changes and modifications, which may occur to those skilled in the art, without departing from the spirit and scope of the disclosure. For example, the USB opening 534, the add-on-circuit-board opening 551, and the cover 553 may be located at bilateral symmetry positions with respect to the above described embodiment in the coupling housing 503. Moreover, the first side-wall may not be provided at the coupling housing 503. For example, the lower housing 502 may include the first side-wall, the upper housing 501 may include the protruding portion 516 protruding outward than the first side-wall in the width direction, and the USB opening 534 may be formed on the first side-wall located below the protruding portion 516.

What is claimed is:

1. An image forming apparatus, comprising:
    an image forming unit configured to form an image on a sheet;
    a first housing accommodating the image forming unit;
    an image reading unit including a reading sensor and a document-supporting surface, the reading sensor being configured to read an image of a document placed on the document-supporting surface;
    a communication circuit board including a communication antenna capable of short-distance wireless communication;
    a second housing located above the first housing and accommodating the image reading unit and the communication circuit board;
    a document cover located above the second housing and configured to cover the document-supporting surface; and
    an operation panel located in front of the second housing;
    wherein the second housing includes:
        a first side wall located at a rear of the operation panel and extending in a front and rear direction, the first side wall being located on a first side with respect to the reading sensor in a width direction orthogonal to the front and rear direction; and
        a second side wall located at the rear of the operation panel and extending in the front and rear direction, the second side wall being located on a second side with respect to the reading sensor in the width direction, the second side being located on a side opposite to the first side with respect to the reading sensor in the width direction, wherein an inner surface of the first side wall is opposed to the communication circuit board, wherein an outer surface of the first side-wall has a mark indicating a position to which a communication object is brought close, wherein the reading sensor is movable in the width direction, wherein the communication circuit board is located outside a movement area of the reading sensor in the width direction, wherein a front end of the reading sensor is located in front of a rear end of the communication circuit board in the front and rear direction and a front end of the communication circuit board is located in front of a rear end of the reading sensor in the front and rear direction, and wherein an upper end of the communication circuit board is located above a lower end of the reading sensor in an up and down direction and an upper end of the reading sensor is located above a lower end of the communication circuit board in the up and down direction.

2. The image forming apparatus according to claim 1,
wherein the operation panel is located at a first side with respect to a center of the second housing in the width direction, the first side being closer to the first side wall than a second side with respect to the center of the second housing in the width direction.

3. The image forming apparatus according to claim 1,
wherein the communication circuit board is located between the first side-wall and the movement area of the reading sensor in the width direction, and
wherein at least a part of the communication circuit board and the reading sensor overlap each other when viewed in the width direction.

4. The image forming apparatus according to claim 1,
wherein the second housing accommodates a shield member capable of shielding electromagnetic waves and located between the reading sensor and the communication circuit board.

5. The image forming apparatus according to claim 1
wherein the image reading unit includes a moving mechanism configured to move the reading sensor in the width direction and a motor configured to drive the moving mechanism, and
wherein a first range, in the front and rear direction, occupied by the communication circuit board in the second housing is spaced apart from a second range, in the front and rear direction occupied by the motor in the second housing.

6. The image forming apparatus according to claim 1,
wherein the image reading unit includes a moving mechanism configured to move the reading sensor in the width direction and a motor configured to drive the moving mechanism, and
wherein a third range, in the width direction, occupied by the communication circuit board in the second housing is spaced apart from a fourth range, in the width direction occupied by the motor in the second housing.

7. The image forming apparatus according to claim 1,
wherein the document cover includes:
a supply tray supporting the sheet;
a conveying mechanism configured to convey the sheet supported by the supply tray;
a conveyance guide configured to guide the sheet conveyed by the conveying mechanism so as to pass above the reading sensor; and
a first discharge tray supporting the sheet having passed above the reading sensor, wherein the conveyance guide includes:
a first part configured to guide the sheet from the supply tray toward a first end of the document cover in the width direction;
a second part configured to guide the sheet from the first end toward the second discharge tray; and
a third part connecting to each of the first part and the second part and configured to cause the sheet to be made a U-turn, and
wherein the communication circuit board is located below the third part of the conveyance guide.

8. The image forming apparatus according to claim 1
wherein the operation panel includes a panel circuit board for operating the image reading unit and the image forming unit,
wherein the image forming unit includes a main circuit board for controlling the image reading unit and the image forming unit, and
wherein the image forming apparatus further comprises a first cable configured to connect the communication circuit board and the panel circuit board, and a second cable configured to connect the panel circuit board and the main circuit board.

9. The image forming apparatus according to claim 1,
wherein the second housing includes:
a first rib protruding from the first side wall in a second-width direction directed from the first side wall toward the communication circuit board in the width direction and extending in the up and down direction, the first rib being in contact with a first circuit-board-surface, in the communication circuit board, opposed to the inner surface of the first side wall;
a second rib protruding upward at a position spaced apart from the first rib in the second-width direction, the second rib being in contact with a second circuit-board-surface, in the communication circuit board, which faces an opposite side to the first circuit-board-surface;
a third rib protruding, in the second-width direction, from the first side wall at a position forward spaced apart from the first rib and the second rib and extending in the up and down direction, the third rib being in contact with a front end of the communication circuit board; and
a fourth rib protruding, in the second-width direction, from the first side wall at a position rearward spaced apart from the first rib and the second rib and extending in the up and down direction, the fourth rib being in contact with a rear end of the communication circuit board, and
wherein at least one of the first rib and the second rib includes a plurality of ribs.

10. The image forming apparatus according to claim 1
wherein the first housing includes a front-opening which is formed on a front surface of the first housing and allowing access to the image forming unit and a front-cover configured to open and close the front-opening.

11. The image forming apparatus according to claim 1
wherein the first housing includes a second discharge tray supporting the sheet on which the image is formed by the image forming unit, and wherein the image forming unit causes the second discharge tray to support the sheet by forwardly discharging the sheet from a rear surface of the first housing.

12. The image forming apparatus according to claim 1 wherein the first side wall of the second housing is located at a position further from a center of the second housing in the width direction than a first end of the first housing in the width direction, the first end of the first housing being an end of the first housing in a first-width direction directed from the communication circuit board to the first side wall in the width direction.

13. The image forming apparatus according to claim 1, wherein the communication circuit board and the mark are located at a front side with respect to a center of the first side wall in the front and rear direction.

14. The image forming apparatus according to claim 1, wherein the first housing includes a first side face located at a first end of the first housing in the width direction and a second side face located at a second end of the first housing in the width direction,
wherein the operation panel includes a first end face located at a first end of the operation panel in the width direction and a second end face located at a second end of the operation panel in the width direction, the first end face and the second end face being opposed to each other in the width direction,
wherein the operation panel forwardly protrudes from the second housing in the front and rear direction and the first end face of the operation panel is located outside the first side face of the first housing in the width direction.

15. The image forming apparatus according to claim 14, wherein the second housing includes a third side face located at a first end of the second housing in the width direction, and a fourth side face located at a second end of the second housing in the width direction and extending in an up and down direction and the width direction, and
wherein a base end of the operation panel is connected to the second housing such that the first end face of the operation panel and the third side face of the second housing are aligned with each other.

16. The image forming apparatus according to claim 1, wherein the image forming unit includes a photosensitive drum.

17. An image forming apparatus, comprising:
a print engine including a photosensitive drum;
a first housing accommodating the print engine;
a scanner including a reading sensor and a document-supporting surface, the reading sensor being for reading an image of a document placed on the document-supporting surface;
a communication circuit board including a communication antenna capable of short-distance wireless communication;
a second housing located above the first housing and accommodating the scanner and the communication circuit board, the second housing including:
  a first side wall extending in a front and rear direction, the first side wall being located on a first side with respect to the reading sensor in a width direction orthogonal to the front and rear direction, the first side wall having an inner surface which is opposed to the communication circuit board and an outer surface which has a mark indicating a position to which a communication object for communicating with the communication circuit board is brought close; and
  a second side wall extending in the front and rear direction, the second side wall being located on a second side with respect to the reading sensor in the width direction, the second side being located on a side opposite to the first side with respect to the reading sensor in the width direction;
a document cover located above the second housing and configured to cover the document-supporting surface; and
an operation panel provided to the second housing and located at a front of the second housing
wherein the reading sensor is movable in the width direction,
wherein the communication circuit board is located outside a movement area of the reading sensor in the width direction,
wherein a front end of the reading sensor is located in front of a rear end of the communication circuit board in the front and rear direction and a front end of the communication circuit board is located in front of a rear end of the reading sensor in the front and rear direction, and
wherein an upper end of the communication circuit board is located above a lower end of the reading sensor in an up and down direction and an upper end of the reading sensor is located above a lower end of the communication circuit board in the up and down direction.

* * * * *